US012534428B2

(12) United States Patent
Meckler et al.

(10) Patent No.: US 12,534,428 B2
(45) Date of Patent: Jan. 27, 2026

(54) NON-DISTILLATIVE PROCESS FOR MANUFACTURING HIGH PURITY AMPHETAMINES

(71) Applicant: PHARMAPOTHECA A, INC., Albany, NY (US)

(72) Inventors: Harold Meckler, Albany, NY (US); Darryl Cleary, Albany, NY (US); Karl Popp, Albany, NY (US); Heidi Schlager, Albany, NY (US); Mozhgan Navidi, Albany, NY (US); Joshua Malone, Albany, NY (US)

(73) Assignee: Pharmapotheca A, Inc., Dover, DE (US)

( * ) Notice: Subject to any disclaimer, the term of this patent is extended or adjusted under 35 U.S.C. 154(b) by 205 days.

(21) Appl. No.: 18/113,047

(22) Filed: Feb. 22, 2023

(65) Prior Publication Data

US 2024/0286993 A1     Aug. 29, 2024

(51) Int. Cl.
*C07C 231/14* (2006.01)
*C07C 209/24* (2006.01)

(52) U.S. Cl.
CPC .......... *C07C 231/14* (2013.01); *C07C 209/24* (2013.01); *C07B 2200/07* (2013.01)

(58) Field of Classification Search
CPC .. C07C 231/14; C07C 209/24; C07B 2200/07
USPC ....................................................... 514/654
See application file for complete search history.

(56) References Cited

U.S. PATENT DOCUMENTS

| | | |
|---|---|---|
| 6,399,828 B1 | 6/2002 | Boswell et al. |
| 7,662,787 B2 | 2/2010 | Mickle |
| 7,705,184 B2 | 4/2010 | Buenger et al. |
| 8,487,134 B2 | 7/2013 | Meudt et al. |
| 9,278,904 B2 | 3/2016 | Meckler et al. |
| 9,321,794 B2 | 4/2016 | Meckler et al. |
| 9,657,041 B2 | 5/2017 | Meckler et al. |
| 10,087,202 B2 | 10/2018 | Meckler et al. |
| 11,123,310 B2 | 9/2021 | Popp et al. |
| 2017/0210768 A1 | 7/2017 | Meckler et al. |

FOREIGN PATENT DOCUMENTS

| | | |
|---|---|---|
| WO | WO 2007/054105 A2 | 5/2007 |
| WO | WO 2011/084098 A1 | 7/2011 |
| WO | WO2017147375 | 7/2017 |

OTHER PUBLICATIONS

Written Opinion of Int'l. Search Authority for PCT/US2015/017265, Feb. 2015.
Int'l. Search Report for PCT/US2015/017265, Feb. 2015.
Written Opinion of Int'l. Search Authority for PCT/US2015/017266, Feb. 2015.
Int'l. Search Report for PCT/US2015/017266, Feb. 2015.
Int'l. Preliminary Report for PCT/US2020/020713, Mar. 2020.
Search History for PCT/US2020/020713, Mar. 2020.
Int'l. Search Report for PCT/US2020/020713, Mar. 2020.
Written Opinion of Int'l. Search Authority for PCT/US2020/020713, Mar. 2020.
PV59265 French Patent 5857M, Apr. 1966.
Kojima, Scifinder CAS Registry 1485-13-8 for 2-methyl-3-phenyl-aziridine, Kojima 1959 et al., 1959.
Allen and Ely, Synthetic Methods for Amphetamines, Crime Scene magazine, p. 15-25 Spring 2011, 2011.
Angew Alkylation of Diethyl Phosphoramidates—A Simple Route from Primary to Secondary Amines, Chem Int ed 1977, 1977.
Mekenyan, Scifinder 2010: 1165579 ACS, Aziridine Use of Genotoxicity Information . . . , Chem Res Tox vol. 23 Issue 10 pp. 1519- 1540, 2010, 2010.
Sakurai, Scifinder 2000- 630740 ACS, Aziridine Recommendation of Occupational exposure limits, J Occup Health, vol. 42, Issue 4, pp213-228, 2000, 2000.
Koleva, Scifinder 2011-1058228 ACS, Modelling of Acute Oral . . . aziridine toxicity, Toxicology InVitro, vol. 25, Issue 7, pp. 1281-1293, 2011, 2011.
Lambrechts, Leuckart-specific impurities in amphetamine, Bulletin on Narcotics, UNODC Everywhere, pp. 47-57, Jan. 1, 1984, 1984.
D'Ambra, Scifinder Search Results for D'Ambra patents (allergy drugs, regioselectivity) Accession 2002-52000, from US20020007068, 1999, 1999.
Rege et al. Drug Metabolism and Disposition, VOl 30 No. 12, pp. 1337-1343, Irreversible Inhibition of CYP2D6 by (−) Chloroephedrine (impurity), 2002, 2002.
EMEA Committee for Medical Products, Grignard Solvents Committee, Feb. 10, 2005, pp. 1-7, 2005.
FDA CDER Guidance for Industry, (genotox guidance) Dec. 2008, 2008.
Skinner, Methamphetamine Synthesis via Hydriodic . . . , Forensic Sci Int'l, 48 (1990) 123-134, red phos method, 1990.
Anderson, Development of a Harmonised Method for Profiling . . . , Forensic Sci Int'l 169 (2007) pp. 50-63, GC method, 2007.
Anderson, Development of a Harmonised Method for Profiling . . . , Forensic Sci Int'l 169 (2007) pp. 64-76, GC method, 2007.
Stojanovska, A Review of Impurity Profiling . . . , Forensic Sci Int'l 224 (2013) 8-26, 2013.
Power, An Unusual Presentation of Customs Seizure, Forensic Sci Int'l 234 (2014) e10-e13, 2014.

(Continued)

*Primary Examiner* — Kristin A Vajda
(74) *Attorney, Agent, or Firm* — JUNEAU & MITCHELL; Todd L. Juneau

(57) ABSTRACT

The invention provides a non-distillative process for manufacturing amphetamine and substituted amphetamines, comprising obtaining a highly pure phosphoramidate compound, converting the highly pure phosphoramidate compound to an amphetamine sulfate compound, concentrating the amphetamine sulfate compound in isopropanol, and then salting out the amphetamine compound directly to obtain an amphetamine salt, the amphetamine salt selected from amphetamine saccharate, amphetamine sulfate, amphetamine aspartate, alkyl-amphetamine saccharate, alkyl-amphetamine sulfate, alkyl-amphetamine aspartate, aryl-amphetamine saccharate, aryl-amphetamine sulfate, aryl-amphetamine aspartate, and mixtures thereof.

19 Claims, No Drawings

(56) References Cited

OTHER PUBLICATIONS

Barker, A Study of the Use of Ephedra, Forensic Sci Int'l 166 (2007) 102-109, 2007.
Humfrey, Keeping Afloat in a Sea of Impurities, Global Safety Assessment, Astra Zeneca Jul. 6, 2007, 2007.
EMEA Solvent (Grignard) impurities, ICH Topic Q3C (R4), pp. 1-22, 2010, 2010.
Funel and Abele, Diels Alder Reactions Part 1, Angewandte Reviews, Angew. Chem Int 2013 vol. 52, 1-44, 2013, 2013.
Funel and Abele, Diels Alder Reactions Part 2, Angewandte Reviews, Angew. Chem Int 2013 vol. 52, 1-44, 2013, 2013.
Funel and Abele, Diels Alder Reactions Part 3, Angewandte Reviews, Angew. Chem Int 2013 vol. 52, 1-44, 2013, 2013.
Funel and Abele, Diels Alder Reactions Part 4, Angewandte Reviews, Angew. Chem Int 2013 vol. 52, 1-44, 2013, 2013.
Stephans, Substituted Aziridines, Prep and Properties, J Chem Engin, vol. 8, No. 4, pp. 625-626, Oct. 1963, 1963.
Stephans, Relative rates of Reaction and Direction of Ring Opening, J Chem Engin, vol. 14, No. 1, pp. 114-115, Jan. 1969, 1969.
Borkovec, Insect Chemosterilants, Aziridnylphosphine Oxides, JMedChem vol. 9, pp. 522-526, Feb. 1966, 1966.
Hata, Fragmentation Reaction of Ylide, JACS vol. 98-19, pp. 6033-6036, Sep. 1976, 1976.
Poshkus, the Reaction of Neutral Esters of Trivalent Phosphorus Acids, JACS vol. 79, pp. 6127-6129, 1957, 1957.
Jessing, Aziridines in Synthesis, Baran Lab Jan. 2007, 2007.
Hassner, A.; Galle, J. E.; "Ring Opening of Aziridine Phosphonates. Correlation of Structure, Nuclear Magnetic Resonance Spectra and Reactivity" J. Org. Chem., 1976, 41, 2273-2276, 1976.
Stromberg, Comparative GC Analysis, J Chromatography 106 (1975) 335-342, amphet sulfate, 1975.
Lambrechts, Profiling of Impurities in Illicit Amphetamine, 1986 J Chromatography vol. 369 (1976) pp. 365-377 HPLC impurities, 1986.
Allen, Methamphetamines from Ephedrine, J Forensic Sci vol. 32, No. 4, Jul. 1987, pp. 953-962, 1987.
Milstein, Friedel Crafts Reactions of Htree Member Heterocycles, J Het Chem vol. 5, pp. 339-241, Mar. 1968, 1968.
Hassner, Regiospecificity: A Useful Terminology, JOC vol. 33, No. 7 pp. 2684-2686 Jul. 1968, 1968.
Todd, Aneurin, A Synthesis of Thiochrome, J Chem Soc 1936, pp. 1601-1605, 1936.
Hider, Prep of Evidence in Amphet Prosecutions, J Forensic Sci pp. 75-79 1960's, 1960.
Anandasankar, Scifinder 7763-71-5, referring to WO 2011 130726, priority to US 2011-32804, and 2010-61325236, 2011.
Osowska-Pacewicka, N-Phosphorylated Aziridines—new reagents for electrophilic amination, Polish J Chem 68-6 pp. 1263-1264 1994, 1994.
Pramanik, An Efficient Scalable Process for Benzphetamine HCI, JACS J Org Process Res Dev 2014 vol. 18 pp. 495-500, 2014.
Giles, A Improved Process for the N-Alkylation of Indoles Using Chiral N-Protected 2-Mehtylaziridines J. Org Proc Res Dev, 2003 vol. 7, pp. 22-24, 2003.
Snodin, Potentially Mutagenic Impurities, J Org Process Res Dev 2014, vol. 18, pp. 836-839 Racemic, 2014.
Raman, Regulatory Expectations Towards Genotoxic, J Org Process Res Dev 2014 vol. 18 pp. 834-835, 2014.
Teasdale, Regulatory Highlights, J Org Process Res Dev 2014 vol. 18, 458-472, 2014.
Jawahar, Direct Stereospecific Synthesis of Unprotected N-H and N-Me Aziridines from Olefins, Sciences 343, 61 pp. 61-65, 2014, 2014.
Koziara, A.; Oleiniczak, B.; Osowska, K.; Zwierzak, A."Phosphoramidomercuration-Demercuration: A Simple Two-Step Conversion of Alkenes into Alkanamines" Synthesis 1982, 918-920, 1982.
Osowska-Pacewicka, Reactions of N-Phosphorylated Aziridines with Dianions Derived from Ethyl Aceotacetate and 1,3 Diketones, Synth. Commun. Org. Chem. vol. 28:7, 1127-1137 1998, 1998.
Gajda, Synthesis of Primary sec-Alkylamines via Nucleophilic Ring-opening of N-Phosphorylated Aziridines, Tetrahedron Letters, 53:13, 4935-4946 1997, 1997.
Breque, A.; Savignac P.; "Derives Phosphoryles des Methyl-1 et Methyl-2 Amino-2 Ethanethiols" Phosphorus and Sulfur. 1980, 89-94, 1980.
US Pharmacopeia; "Dextroamphetamine Sulfate Tablets" Official Monographs. 2014, 2570-2571, 2014.
Herbrink, M.; Thijssen, B.; Hillebrand, M.J.X.; Rosing, H.; Schellen, J.H.M.; Nuijen, B.; Beijnen, J.H.; "Development and validation of a high-performance liquid chromatography-tandem mass spectrometry assay for the quantification of Dexamphetamine in human plasma" Journal of Pharmaceutical and Biomedical Analysis. 2018. 259-264, 2018.

NON-DISTILLATIVE PROCESS FOR MANUFACTURING HIGH PURITY AMPHETAMINES

TECHNICAL FIELD

Embodiments of the present invention relate generally to producing substituted and unsubstituted amphetamine salts from a process that excluded the necessity of distillation of converting a highly pure (99.+% pure) phosphoramidate compound to an amphetamine sulfate compound, concentrating the amphetamine sulfate compound in a C1 to C5 organic alcohol, and then salting out the high purity amphetamine sulfate salt directly.

BACKGROUND

The initial synthesis of amphetamine was described by Edeleano in the late 1880's. [Ber.20, 616 (1887)][source Merck Index]. Synthesis routes have been described in patents, such as U.S. Pat. No. 1,921,424, and in the literature, such as the Journal of the American Chemical Society. [Hartung, W. H and Munch, J. C., J. Amer. Chem. Soc. 53, 1875 (1931)].

However, prior art processes produce identifiable and measurable quantities cis and trans isomers of 2-methyl-3-phenylaziridine impurities which are potentially genotoxic impurities (PGIs). Fractional distillation to reduce the impurity is difficult because the boiling point difference between cis/trans mixture of 2-methyl-3-phenylaziridine and dextroamphetamine is extremely small and the aziridines distill first.

A further problem is that amphetamines are marketed as a long-term treatment of boys aged 5 to 20 who are diagnosed with attention deficit hyperactivity disorder (ADHD). In contrast to existing processes, if FDA approval were sought anew, all PGI would be required to be in the parts per million levels.

Another problem with amphetamine synthesis is that amphetamines have a stereo-defined amine center, which can be subject to racemization. Accordingly, only stereospecific methods are useful. However, stereospecific methods do not historically provide the economic requirements of high yields, high selectivity and low process costs. Typically such reactions involve a coupling agent, such as Grignard or organolithium reagents. Conventional teaching requires that the use such organometallics requires that the reaction temperature be maintained at a cold temperature, such as an ice bath at less than 10° Celsius.

Another problem is that there is a need for dosage forms for amphetamine-related compounds that have a statistically significant absence of such impurities. Complicating the amphetamine marketplace, established formulations which require racemic amphetamine to obtain an extended release of elevated blood levels of the drug. This racemic material can be obtained by mixing equal parts of the dextrorotary and levorotary stereos isomers or running a synthetic sequence which only produces racemic amphetamine.

Another problem with amphetamine synthesis is that the intermediates are toxic as well as flammable. This requires special handling such as double-walled drums and safety accommodations to protect manufacturing personnel. For example, the prior art in U.S. Pat. No. 6,399,828 teaches the production of amphetamine using various methods. In one approach norephedrine is refluxed with hydrogen iodide and red phosphorous. In another approach norephedrine is chlorinated using thionyl chloride and then catalytically hydrogenated. In U.S. Pat. No. 7,705,184, amphetamine synthesis is disclosed using hydrogenation of a chlorinated phenylpropanolamine. Aziridine chemistry, and specifically aziridine phosphoramidates are not taught in the amphetamine synthesis prior art.

An additional problem has been that Zwierzak et al. disclose a method of reacting N-phosphorylated aziridines with copper-modified Grignard reagents as a new route to substituted pyrrolines and pyrrolidines. However, Zwierzak et al discloses this method as being regiospecific, which it is not. Int'l J. for Rapid Commun. of Syn. Org. Chem., 28:7, 1127-1137 (1998). Accordingly, the prior art contains an erroneous teaching providing disinformation to synthetic efforts that attempted to follow it.

Another problem stems from the use of protecting groups and leaving groups. There is significant variation among the various protecting groups, such as where a carbonyl is used as a protecting group, the reaction must be kept at below −10° Celsius or the carbonyl will react with the Grignard reagent. In another example, where a sulfonyl is used as a protecting group, it is impossible to remove the protecting group without destroying the molecule.

Finally, there is the problem of finding a process that generates an adequate yield, such that even when one obtains highly pure alkyl or aryl phosphoramidate compounds and hydrolyzes to the desired alkyl or aryl substituted or unsubstituted amphetamine compounds, the traditional approach of using a final distillation step results in the loss of yield.

Accordingly, there is a need for a non-distillative process for obtaining amphetamine salts that are manufactured from highly pure alkyl or aryl phosphoramidate compounds which are made using synthetic processes which have high chemical yield, high selectivity, low cost, lower toxicity, have less impurities, and are less dangerous to handle.

SUMMARY

In some embodiments, the present invention provides a non-distillative process for manufacturing amphetamine and substituted amphetamines. In preferred embodiments, the process includes obtaining a highly pure phosphoramidate compound, converting the phosphoramidate compound to an amphetamine sulfate compound, concentrating the amphetamine sulfate compound in isopropanol, and then salting out the amphetamine compound directly to obtain an amphetamine salt, such as amphetamine saccharate, or amphetamine aspartate. The process works for dextro- and levo-isomers as well as for racemic mixtures.

DETAILED DESCRIPTION

Certain features of various embodiments of the present technology are set forth with particularity in the appended claims. A better understanding of the features and advantages of the technology will be obtained by reference to the following detailed description that sets forth illustrative embodiments, in which the principles of the invention are utilized.

In a preferred non-limiting embodiment, the invention is directed to a non-distillative process for manufacturing amphetamine and substituted amphetamines, comprising obtaining a highly pure phosphoramidate compound, converting the highly pure phosphoramidate compound to an amphetamine sulfate compound, concentrating the amphetamine sulfate compound in isopropanol, and then salting out the amphetamine compound directly to obtain an amphetamine salt, the amphetamine salt selected from amphetamine saccharate, amphetamine sulfate, amphetamine aspartate, alkyl-amphetamine saccharate, alkyl-amphetamine sulfate, alkyl-amphetamine aspartate, aryl-amphetamine saccharate, aryl-amphetamine sulfate, aryl-amphetamine aspartate, and mixtures thereof.

Any of the processes herein may include wherein the phosphoramidate compound is (S or R,S) (dialkyl or diaryl) (1-phenylpropan-2-yl)phosphoramidate.

Any of the processes herein may include wherein the substituted amphetamine salt is selected from dextroamphetamine saccharate, dextroamphetamine sulfate, or dextroamphetamine aspartate.

Any of the processes herein may include wherein the substituted amphetamine salt is >99% pure.

Any of the processes herein may include wherein converting the highly pure phosphoramidate compound to a substituted amphetamine sulfate compound comprises the steps of adding aqueous H2SO4 to a (S or R,S) (dialkyl or diaryl)(1-phenylpropan-2-yl)phosphoramidate compound, warming to 80° C., cooling to 20° C., washing in isopropanol or toluene, combining organic layers, and collecting a solid by filtration.

Any of the processes herein may include wherein the substituted amphetamine salt is optically active or a racemic mixture thereof.

Any of the processes herein may include wherein the substituted amphetamine salt is selected from the group consisting of a dextroamphetamine salt, a levoamphetamine salt, or a mixture thereof.

Any of the processes herein may include where the substituted amphetamine salt is formulated in a pharmaceutically acceptable composition.

Any of the processes herein may include wherein converting the highly pure phosphoramidate compound to a substituted amphetamine sulfate compound comprises the steps of hydrolyzing the phosphoramidate compound in aqueous hydrochloric acid at 80° C. to obtain a substituted amphetamine free base, cooling to about 25° C., agitating in toluene, adjusting an organic layer to about pH 13, washing with methyl-tert-butyl-ether (MTBE), combining organic layers, diluting with isopropanol, warming to 45-50° C., and concentrating under vacuum to obtain a substituted amphetamine dissolved in isopropanol.

Any of the processes herein may include wherein the phosphoramidate is diethyl-(1-phenylpropan-2-y) phosphoramidate.

Any of the processes herein may include wherein the phosphoramidate is diethyl-(1-phenylpropan-2-y) phosphoramidate is optically active.

Any of the processes herein may include wherein the phosphoramidate is diethyl (S)-(1-phenylpropan-2-y) phosphoramidate], diethyl (R)-(1-phenylpropan-2-y) phosphoramidate.} or mixtures thereof.

Any of the processes herein may include wherein the substituted amphetamine free base is optically active, dextrorotatory, levorotatory, or racemic.

Any of the processes herein may include wherein the substituted amphetamine free base is not isolated or purified, and exists within a slurry.

Any of the processes herein may include wherein the purity of the substituted amphetamine salt is not less than 98% on a weight basis.

Any of the processes herein may include wherein the substituted amphetamine salt comprises a regiospecific impurity β-methylphenethylamine present at a level of less than 0.1% on a weight basis.

Any of the processes herein may include wherein the substituted amphetamine salt is lisdexamfetamine.

In another preferred embodiment, the invention includes a pharmaceutical composition comprising a substituted amphetamine salt made according to the processes herein, and a pharmaceutically acceptable carrier.

In another preferred embodiment, the invention includes a process, comprising:
  (i) reacting (S or R,S) (dialkyl or diaryl)(1-phenylpropan-2-yl)phosphoramidate, with 3N HCl at 80° C. for 1.5 h, cooling to room temperature, adding toluene and agitating, and removing an organic layer;
  (ii) reacting the organic layer with 50% NaOH to adjust pH to 13, agitating with methyl-tert-butyl-ether (MTBE), separating an aqueous layer from an organic layer, washing the organic layer with MTBE;
  (iii) diluting the organic layer with isopropanol, warming to 45-50° C., and concentrating under vacuum to obtain (S or R,S) (dialkyl or diaryl)(1-phenylpropan-2-yl) amine dissolved in isopropanol;
  (iv) adding H2SO4 aq and isopropanol to the (S or R,S) (dialkyl or diaryl) (1-phenylpropan-2-yl)-amine dissolved in isopropanol while maintaining 45-50° C.;
  (v) adding isopropanol, and warming to 80° C. for 1 h, cooling to 50° C. over 6 h, 20° C. over 5 h, and maintaining at 20° C. for 4 h;
  (vi) adding isopropanol and cooling to 5° C., agitating for 6 h;
  (vii) collecting a solid by filtration, washing with cold isopropanol/water;
  wherein the solid is a (S or R,S) (dialkyl or diaryl) (1-phenylpropan-2-yl)-amine [H2SO4] having a purity of >99.9%.

In another preferred embodiment, the invention includes a process, wherein the (S or R,S) (dialkyl or diaryl) (1-phenylpropan-2-yl)-amine [H2SO4] is converted to a saccharic acid salt or a aspartic acid salt, the steps comprising:
  (viii) making a slurry in water at RT of the (S or R,S) (dialkyl or diaryl) (1-phenylpropan-2-yl)-amine [H2SO4], adding 50% aq NaOH, stir 0.5 h, agitating 0.5 h w/ MTBE, and obtaining an organic layer, diluting the organic layer with isopropanol, warming to 50° C., concentrating under vacuum, and cooling to RT;
  (ix) making slurry from a saccharate or aspartate, cooling the slurry to 5° C. and treating with concentrated H2SO4 aq., agitating for 0.25 h at 5° C., warming to RT, stirring for 1 h, diluting with isopropanol and agitating for 1 h, and filtering to obtain a saccharic acid filtrate or aspartic acid filtrate;
  (x) adding saccharic acid filtrate or aspartic acid filtrate to the (S or R,S) (dialkyl or diaryl) (1-phenylpropan-2-yl)-amine [H2SO4] to obtain a slurry, agitating for 1.5 h at RT, gradually warming and holding at 55° C., slowly adding water to yield clear solution, agitating the clear solution for 2 h, reducing the heat to 45° C. over 3 h, cooling to 5° C. over 5 h, holding for 7 h, and obtaining a white solid by filtration;
  wherein the white solid is >99.9% chiral (dex) isomer of (S or R,S) (dialkyl or diaryl) (1-phenylpropan-2-yl)-amine-[saccharate] or (S or R,S) (dialkyl or diaryl) (1-phenylpropan-2-yl)-amine-[aspartate].

In another preferred embodiment, the invention includes a pharmaceutical composition, comprising a saccharic acid salt or a aspartic acid salt of a substituted amphetamine made according to the processes herein, and a pharmaceutically acceptable carrier.

In another preferred embodiment, the invention includes a process, comprising:
(i) reacting (S or R,S) (dialkyl or diaryl)(1-phenylpropan-2-yl)phosphoramidate, with H2SO4 aq and warming to 80° C. for 1 h, cooling to 20° C.;
(ii) adding toluene, concentrating under vacuum, wash/repeat until water wt. is 0.11 weight %;
(iii) adding toluene, warming to 80° C., agitating 1 h, cooling to 50° C. over 2 h, cooling to RT, and holding at RT 4-24 h;

wherein the white solid is >99.9% chiral (dex) isomer of (S or R,S) (dialkyl or diaryl) (1-phenylpropan-2-yl)-amine-[saccharate] or (S or R,S) (dialkyl or diaryl) (1-phenylpropan-2-yl)-amine-[aspartate].

In another preferred embodiment, the invention includes a pharmaceutical composition, comprising a saccharic acid salt or a aspartic acid salt of a substituted amphetamine made according to the processes herein, and a pharmaceutically acceptable carrier.

The following are preferred non-limiting schemes describing exemplary processes of the invention herein.

Scheme 1: Dextroamphetamine Salts by HCl process

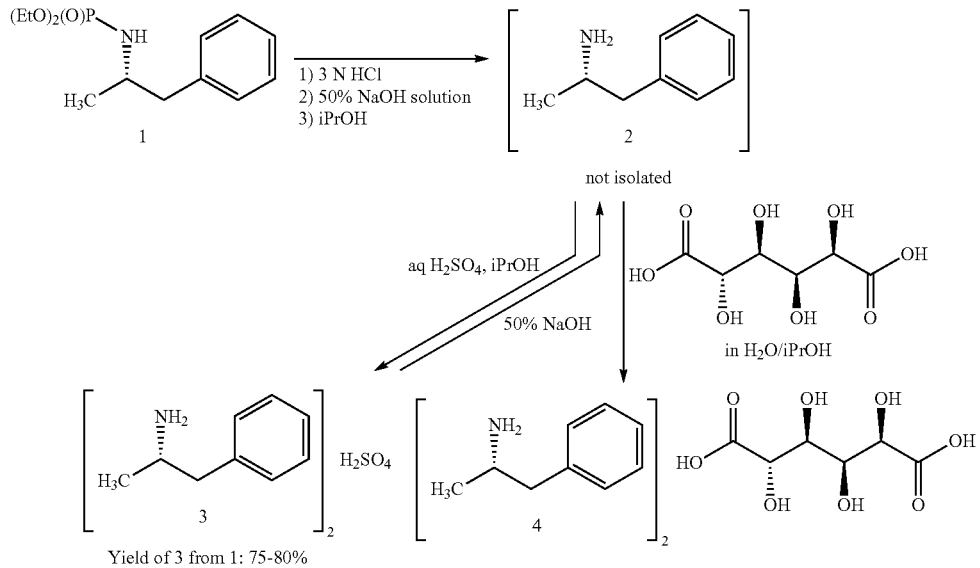

(iv) cooling to 5° C., and holding for 12 h;
(v) collecting a solid by filtration;
wherein the solid is a (S or R,S) (dialkyl or diaryl) (1-phenylpropan-2-yl)-amine [H2SO4] having a purity of >99.92% AUC.

In another preferred embodiment, the invention includes wherein the (S or R,S) (dialkyl or diaryl) (1-phenylpropan-2-yl)-amine [H2SO4] is converted to a saccharic acid salt or a aspartic acid salt, the steps comprising:
(vi) making a slurry in water at RT of the (S or R,S) (dialkyl or diaryl) (1-phenylpropan-2-yl)-amine [H2SO4], adding 50% aq NaOH, stir 0.5 h, agitating 0.5 h w/ MTBE, and obtaining an organic layer, diluting the organic layer with isopropanol, warming to 50° C., concentrating under vacuum, and cooling to RT;
(vii) making slurry from a saccharate or aspartate, cooling the slurry to 5° C. and treating with concentrated H2SO4 aq., agitating for 0.25 h at 5° C., warming to RT, stirring for 1 h, diluting with isopropanol and agitating for 1 h, and filtering to obtain a saccharic acid filtrate or aspartic acid filtrate;
(viii) adding saccharic acid filtrate or aspartic acid filtrate to the (S or R,S) (dialkyl or diaryl) (1-phenylpropan-2-yl)-amine [H2SO4] to obtain a slurry, agitating for 1.5 h at RT, gradually warming and holding at 55° C., slowly adding water to yield clear solution, agitating the clear solution for 2 h, reducing the heat to 45° C. over 3 h, cooling to 5° C. over 5 h, holding for 7 h, and obtaining a white solid by filtration;

Conversion of Compound 1 to Compound 2:

To Compound 1 (100.1 g, 369 mmol, 1.0 equivalent; <0.1% of the regioisomeric isomer; 99.5% dextrorotary isomer) was added water (182 mL) followed by concentrated hydrochloric acid (60 mL, 730 mmoL, 1.97 Equivalents)) and the resultant mixture was heated to 80° C. and held for 1.5 h. The mixture was cooled to RT, toluene (167 mL 1.7 Volumes) was added, and the batch agitated. The organic layer was removed, and the pH was adjusted to 13 with 50% aqueous NaOH (83.7 ml, 1.58 moL, 4.3 equivalents). The mixture was first mixed and agitated with methyl tert-butyl ether (117 ml, 1.17 volumes), and the layers were separated. The remaining aqueous layer was extracted with methyl tert-butyl ether (117 mL, 1.17 volumes) and then the remaining aqueous layer was discarded. The combined organic layers were washed with water (75 mL) and after separation, the aqueous layer was discarded. The organic solution was diluted with isopropanol (500 mL). The batch was warmed (ca. 45° C.-50° C.), and carefully concentrated under reduced pressure (26-28 in. Hg vacuum,) affording about 375 ml of the desired Compound 2 dissolved in isopropanol which was used "as is".

Conversion of Compound 2 to Compound 3:

An isopropanol solution of Compound 2 dissolved in isopropanol (365 ml total volume) was treated with water (16.0 ml, 0.16 volumes) followed by the careful addition of a solution of concentrated sulfuric acid (9.9 ml, 0.5 equivalents), isopropanol (65 ml, 0.65 volumes) and water (31 ml, 0.31 volumes) carefully maintaining the temperature no higher than 40-45° C. Isopropanol was added (78.0 ml, 0.78 volumes) the solution warmed to 80° C. and water (59 ml. 0.59 volumes) was added. The batch was maintained therein for 1 h. The batch was cooled to 50° C. over 6 h, cooled to 20° C. over 5 h and maintained there for 4 h. Isopropanol 646 ml, 6.46 volumes) was added and the reaction mixture was cooled to 5° C. and agitated there for 6 h. The solid was collected by filtration filtered and washed with cold isopropanol/water (11:1). After drying (26"-28" Hg, 35° C.) for 24 h, the desired compound 3 (53.94 g, 79.3%) was obtained as a white solid. The isolated 3 had a decomposition point of 344° C. (by DSC) and was >99.5% pure (non-chiral UHPLC) and >99.9% dextrorotary isomer (chiral HPLC). The specific rotation was +230 (c=40 mg/ml in water); 1HNMR (D20): 7.38-7.25 (m, 10H), 3.57 (sex, J=13.6, 6.8 Hz, 2H), 2.88 (d, J=6.8 Hz, 4H), 1.24 (d, J=6.8 Hz, 6H).

Conversion of Compound 3 to Compound 4:

a. Compound 3 (20.04 g, 54 mmoL, 1 equivalent) was slurried in water (200 ml, 10 volumes) at ambient temperature followed by the addition of 50% aqueous NaOH (12.3 ml, 230 mmol, 4.3 equivalents) resulting in a white cloudy suspension. The batch was stirred for 0.5 h and the aqueous layer was agitated for 0.5 h with methyl tert-butyl ether (40 ml, 2 volumes). Following phase separation, the organic layer was separated and retained. The resultant aqueous layer was agitated for 0.5 h with methyl tert-butyl ether (40 ml, 2 volumes). Following the phase separation, the combined organic layers were washed with water (20.0 ml, 1 volume). The separated organic layer was diluted with isopropanol (146 ml, 7.33 volumes) and the batch gradually warmed to 50° C. The batch was then concentrated under reduced pressure (26"-28" Hg) to 46 ml (4.3 volumes) and cooled to RT.

b. A slurry was prepared from calcium saccharate tetrahydrate (18.44 g, 57 mmoL, 0.53 equivalents) and water (31 ml, 1.54 volumes). The resultant slurry was cooled (5° C.) and carefully treated over 0.5 h with a solution of concentrated sulfuric acid (3.1 ml, 0.53 equivalents) and water (5.9 ml, 0.29 volumes). The resultant slurry was agitated for 0.25 h at (5° C.), warmed to RT and further stirred for 1 h. This slurry was diluted with isopropanol (154 ml, 7.71 volumes) and agitated for 1 h. The slurry was then filtered through a fritted funnel and the filter-cake rinsed with isopropanol (62 ml, 3.12 volumes)

c. The saccharic acid filtrate was gradually added to the Compound 2 [3?] isopropanol solution resulting in a white slurry. This slurry was agitated for 1.5 h at RT and then gradually warmed and held at 55° C. Water (8.0 ml, 0.4 volumes) was slowly added resulting in a clear solution. This solution was agitated for 2 h whereupon the temperature was reduced to 45° C. over 3 h whereupon crystallization began. The slurry was gradually cooled to 5° C. over 5 h and held there for 7 h. The white solid was collected via filtration through a fritted funnel and the solid rinsed with isopropanol; (35 ml, 1.76 volumes). Drying under reduced pressure (26"-28" Hg, 65-70° C.) afforded 20.33 g (77.8%) of the desired Compound 4 as a white crystalline solid. The isolated 4 has a melting point of 169° C. (by DSC) and was >99.7% pure (by non-chiral UHPLC) and >99.9% dextrorotary isomer (chiral HPLC). The specific rotation was +19.20 (c=40 mg/ml in water); 1HNMR (D20): 7.38-7.24 (m, 10H), 4.06 (d, J=2.8 Hz, 1H), 4.04 (d, J=4.8 Hz, 1 H), 4.014-3.99 (m, 1H), 3.86 (t, J=4.4 Hz, 1H), 3.57 (sextet, J=6.8 Hz, 2H), 2.88 (d, J=7.6 Hz, 4H), 1.24 (d, J=6.8 Hz, 6H).

If necessary, compound 4 can be recrystallized from aqueous isopropanol.

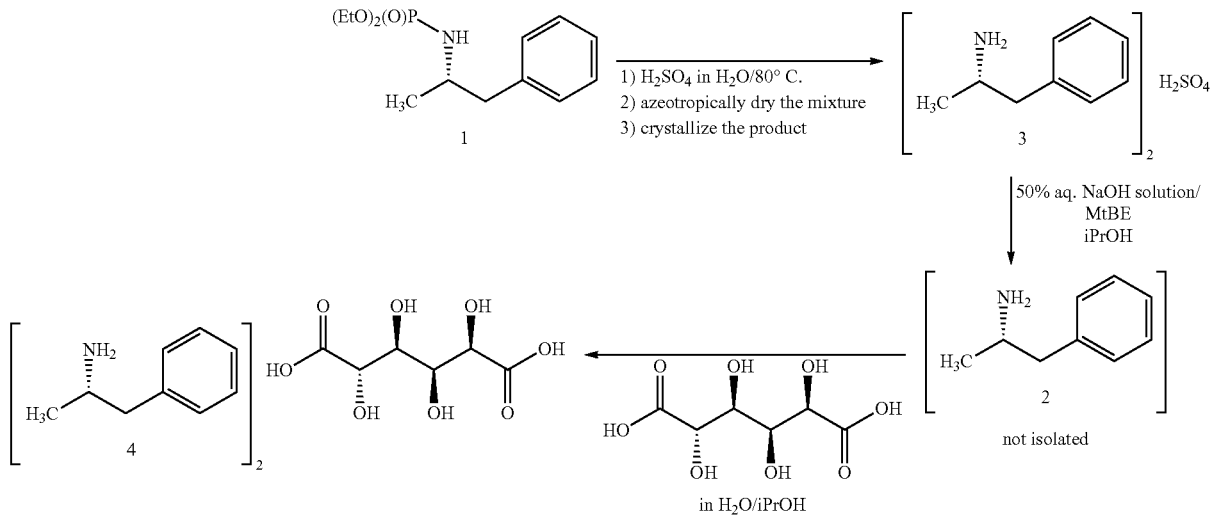

Conversion of Compound 1 to Compound 3:

To a slurry of Compound 1 (50.00 g, 0.184 mol, 1.0 equivalent, <0.1% of the regioisomeric isomer; 99.5% dextrorotary isomer) in water (150.00 mL, 3.0 vol) was added concentrated H₂SO₄ (95-98%, 6.19 mL, 0.11 mol, 0.6 equivalents). The slurry was heated to 80° C. at which point the solids dissolved. The batch was agitated for 16 h, after which point the IPC by HPLC showed >99% conversion to Compound 3. The batch was then gradually cooled to 20° C. at which point toluene (250.00 mL, 5.0 vol) was added. The batch was concentrated under vacuum (26-28 In Hg) to about 125.00 mL (2.50 vol). This process (addition of toluene and concentration) was repeated three more times until residual water content of 0.11 weight % was obtained based on KF titration (target <3 weight %). The mixture was diluted with fresh toluene (375 mL, 7.5 vol). The batch was warmed to 80° C. and agitated at 80° C. for 1 h before being gradually cooled to 50° C. over the next 2 hours at which point the 3 crystallized. The batch was cooled to room temperature and held a that temperature for 4 to 24 hours. Finally, the slurry was cooled to 5° C. and held at that temperature for about 12 h. The resulting crystalline solid was collected by filtration and rinsed with cold toluene (2×3.0 vol). After drying under reduced pressure at 35° C. for 24 h compound 3 was obtained as a white crystalline solid in quantitative yield. The overall UHPLC purity was 99.92% AUC. 1HNMR (D20): 7.39-7.25 (m, 10H), 3.58 (sextet, J=6.8 Hz, 2H), 2.89 (dd, J=6.8, 1.6 Hz, 4H), 1.23 (d, J=6.4 Hz, 6H). The solid contained about 5% mol % Toluene based on 1HNMR analysis.

Compound 3 from the above procedure was slurried in a mixture of water (3 mL) and toluene (57 mL) for 20 hours at room temperature and then cooled to 5° C. in ice-water bath. The mixture was stirred for an additional 7 h. at which point the solid 3 was collected by vacuum filtration. The flask and filter cake were rinsed with $H_2O$ (0.32 vol) and Toluene (3.56 vol). After drying under reduced pressure at 70° C. for 18 h the 3 was obtained as a white solid with 92.0% recovery. The overall achiral UHPLC purity was 99.92%. This material was >99.9% of the dextrorotary isomer by chiral HPLC analysis and the specific rotation consistent with earlier samples. The 1HNMR of this 3 matched earlier 1HNMRs.

Conversion of Compound 3 into Compound 4 a. Compound 3 (20.04 g, 54 mmoL, 1 equivalent) was slurried in water (200 ml, 10 volumes) at ambient temperature followed by the addition of 50% aqueous NaOH (12.3 ml, 230 mmol, 4.3 equivalents) resulting in a white cloudy suspension. The batch was stirred for 0.5 h and the aqueous layer was agitated for 0.5 h with methyl tert-butyl ether (40 ml, 2 volumes). Following phase separation, the organic layer was separated and retained. The resultant aqueous layer was agitated for 0.5 h with methyl tert-butyl ether (40 ml, 2 volumes). Following phase separation, the combined organic layers were washed with water (20.0 ml, 1 volume). The separated organic layer was diluted with isopropanol (146 ml, 7.33 volumes) and the batch gradually warmed to 50° C. The batch was then concentrated under reduced pressure (26"-28" Hg) to 46 ml (4.3 volumes) and cooled to ambient temperature.

b. A slurry was prepared from calcium saccharate tetrahydrate (18.44 g, 57 mmoL, 0.53 equivalents) and water (31 ml, 1.54 volumes). The resultant slurry was cooled (5° C.) and carefully treated over 0.5 h with a solution of concentrated sulfuric acid (3.1 ml, 0.53 equivalents) and water (5.9 ml, 0.29 volumes). The resultant slurry was agitated for 0.25 h at 5° C., warmed to RT and further stirred for 1 h. This slurry was diluted with isopropanol (154 ml, 7.71 volumes) and agitated for 1 h. The slurry was then filtered through a fritted funnel and the filter-cake rinsed with isopropanol (62 ml, 3.12 volumes)

c. The saccharic acid filtrate was gradually added to the crude Compound 2 isopropanol solution resulting in a white slurry. This slurry was agitated for 1.5 h, at ambient temperature and then gradually warmed and held at 55° C. Water (8.0 ml, 0.4 volumes) was slowly added resulting in a clear solution. This solution was agitated for 2 h whereupon the temperature was reduced to 45° C. over 3 h whereupon crystallization began. The batch was gradually cooled to 5° C. over 5 h and held there for 7 h. The white solid was collected via filtration through a fritted funnel and the solid rinsed with isopropanol; (35 ml, 1.76 volumes). Drying under reduced pressure (26"-28" Hg, 65-70° C.) afforded 20.33 g (77.8%) of the desired compound 4 which matched the compound 4 prepared by the HCl procedure.

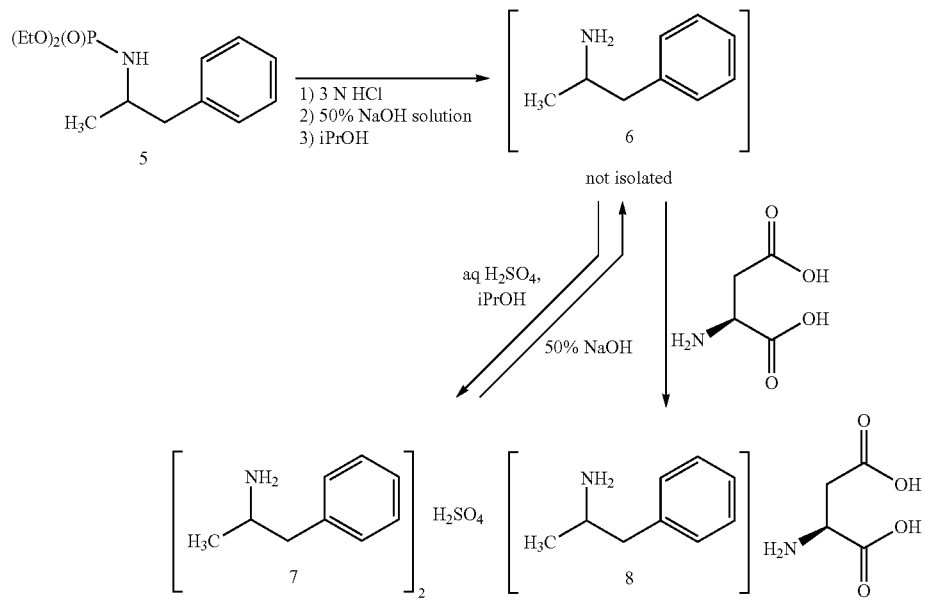

Scheme 3: Racemic amphetamine Salts by HCl process

Conversion of Compound 5 to Compound 6:

To Compound 5 (100 g, 368 mmol, 1.0 Equivalent; 0.04% of the regioisomeric isomer) was added water (182 ml, 1.82 volumes) followed by concentrated hydrochloric acid (60.0 ml, 730 mmoL, 1.97 equivalents) and the resultant mixture was heated to 80° C. held and agitated for 1.5 h. The mixture was cooled to RT and treated with toluene (167 ml, 1.67 volumes). The biphasic batch was agitated for 0.25 h and the separated organic layer was discarded. The pH of the aqueous solution was adjusted to 13 via the slow addition of 50% aqueous NaOH (83.7 ml, 1580 mmol, 4.3 equivalents). The mixture was agitated for 0.25 h, and methyl tert-butyl ether (117 ml, 1.17 volumes) and the layers were separated. The remaining aqueous layer was extracted with methyl tert-butyl ether (117 mL, 1.17 volumes) and after separation the aqueous layer was discarded. The combined organic solution was washed with water (85 mL) and after separation, the aqueous wash was discarded. The organic layer was diluted with isopropanol (500 mL). The batch was warmed (ca. 45° C.-50° C.), and carefully concentrated under reduced pressure (26-28 in. Hg vacuum,) affording about 350 mL of the desired Compound 6 dissolved in isopropanol which was used "as is".

Conversion of Compound 6 to Compound 7:

The isopropanol solution of Compound 6 was cooled to RT and then treated with water (16 ml, 0.16 volumes). A solution prepared from water (31.0 ml, 0.31 volumes), isopropanol (65 ml, 0.65 volumes and concentrated sulfuric acid (9.9 ml, 0.5 equivalents) was slowly added. An isopropanol (78 ml, 0.78 volumes) rinse was added, and the batch was heated to 80° C. Following the addition of water (59 ml, 0.59 volumes) the solution was agitated for 1 h. The batch was cooled to 50° C. over a 6 h. period. The resulting slurry was further cooled to 200 C over 5 h and maintained there for 4 h. Isopropanol (646 ml, 6.46 volumes) was added, and the reaction mixture was cooled to 5° C. and held there with agitation for 5 h. The solid product was collected by filtration, washed with cold Isopropanol/water (11:1), and dried (26"-28" Hg, 350 C) for 24 h, affording the compound 7 (55.32 g, (81.4% yield) as a white solid which was >99.5% pure (non-chiral UHPLC) and a 1:1 mixture of dextrorotary: levorotary isomers (chiral HPLC).

Conversion of Compound 7 to Compound 8:

Compound 7 (50.06 g, 0.136 mol, 1.0 equivalent) was slurried in water (500.00 mL, 10.0 vol). To the stirred batch, 0.5 h. Following phase separation, the organic layer was separated and retained. The remaining aqueous layer was stirred for 1 h with methyl tert-butyl ether (100 ml, 2 volumes). Following phase separation, the aqueous layer was discarded. The two organic layers were combined and washed with water (50 ml, 1 volume) for 0.5 h, whereupon the aqueous layer was removed and discarded. The organic solution was diluted with isopropanol (268 ml, 7.33 volumes) and the batch gradually warmed to 50° C. The batch was then carefully concentrated under reduced pressure (26"-28" Hg) to a volume of c.215 ml (4.3 volumes).

The room temperature solution was treated with water (215 ml, 4.30 vol) and Aspartic Acid (36.10 g, 0.2714 mol, 2.0 equivalents) was added to the batch. The reaction mixture was held overnight at 20° C. The batch was gradually warmed to 40° C. and passed through a fritted funnel. The filtrate was then charged back to the reactor, and rinsed with isopropanol (50 mL, 1.0 vol). The batch was further warmed to 50° C. and concentrated under reduced pressure (26-28 In Hg) to 215 mL (4.30 vol). The mixture was sequentially azeotropically dried with isopropanol (6×293 ml, 5.87 vol), and concentrated under reduced pressure to a volume of 215 mL (4.30 vol each time). The batch was diluted with Isopropanol (176 mL, 3.52 vol) and 95% Ethanol (168 mL, 3.37 vol) and cooled to 5° C. The batch was agitated at 5° C. for 4 h. The resulting crystalline solid was collected by filtration over a fritted funnel and washed with cold 95% Ethanol (132 mL, 2.64 vol). After drying under reduced pressure at 35° C. for 64 h, 64.43 g (88.4%) of the desired Compound 8 was obtained as a white crystalline solid with a melting point of 187° C. (by DSC). The overall UHPLC purity was 99.8%. 1H NMR (D20): 7.39-7.24 (m, 5H), 3.83 (dd, J=8.8, 3.6 Hz, 1H), 3.58 (sextet, J=6.8 Hz, 1H), 2.89 (dd, J=6.8, 1.2 Hz, 2H), 2.76 (dd, J=17.6, 4.0 Hz, 1H), 2.61 (dd, J=17.2, 8.8 Hz, 1H), 1.25 (d, J=6.8 Hz, 3H).

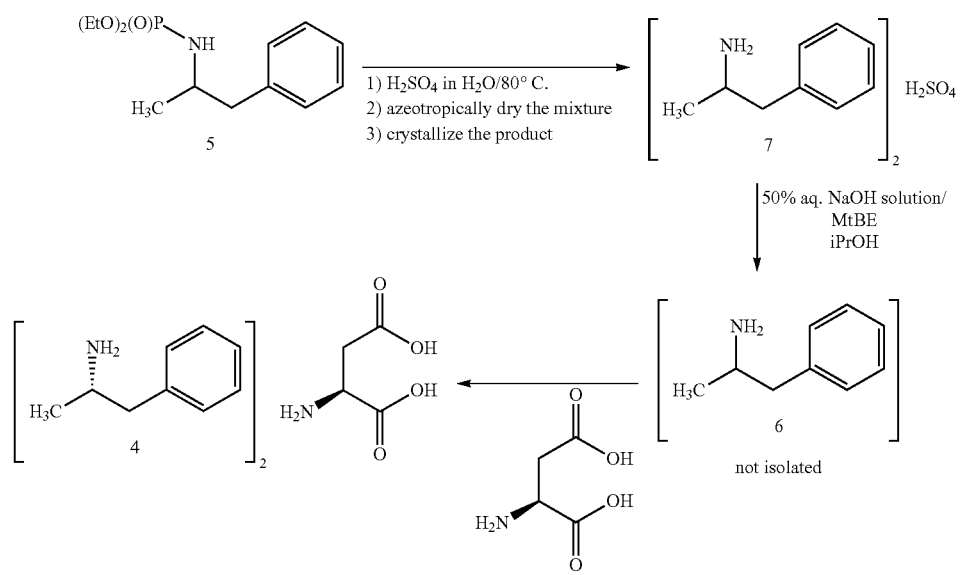

Scheme 4: Racemic Amphetamine Salts by $H_2SO_4$ process

50% aqueous NaOH (30.8 mL, 0.58 mol, 4.3 equivalent) was added in one portion (pH≥13). The basic batch was stirred for 0.5 h. and methyl tert-butyl ether (100 ml, 2 volumes) was added. The biphasic mixture was stirred for Conversion of Compound 5 to Compound 7:

To a slurry of Compound 5 (50.00 g, 0.184 mol, 1.0 equivalent, 0.04% of the regioisomeric isomer) in water (150.00 mL, 3.0 vol) was added concentrated H2SO4 (95-

98%, 6.19 mL, 0.11 mol, 0.6 equivalents). The slurry was heated to 80° C. at which point the solids dissolved. The batch was agitated for 16 h, after which point the IPC by HPLC showed >99% conversion to Compound 7. The batch was then gradually cooled to 20° C. at which point toluene (250.00 mL, 5.0 vol) was added. The batch was concentrated under vacuum (26-28 In Hg) to about 125.00 mL (2.50 vol). This process (addition of toluene and concentration) was repeated three more times until residual water content of 0.2 weight % was obtained based on KF titration (target <3 weight %). The mixture was diluted with fresh toluene (375 mL, 7.5 vol). The batch was warmed to 80° C. and agitated at 80° C. for 1 h before being gradually cooled to 50° C. over the next 2 hours at which point the 7 crystallized. The stirred batch was cooled to room temperature and held a that temperature for about 24 hours. Finally, the stirred slurry was cooled to 5° C. and held at that temperature for about 12 h. The resulting crystalline solid was collected by filtration and rinsed with cold toluene (2×3.0 vol). After drying under reduced pressure at 35° C. for 24 h compound 7 was obtained as a white crystalline solid in quantitative yield. The overall UHPLC purity was 99.92% AUC. 1HNMR (D20): 7.39-7.25 (m, 10H), 3.58 (sextet, J=6.8 Hz, 2H), 2.89 (dd, J=6.8, 1.6 Hz, 4H), 1.23 (d, J=6.4 Hz, 6H). The solid contained about 5 mol % Toluene, based on 1HNMR analysis.

Compound 7 from the above procedure was slurried in a mixture of water (3 mL) and toluene (57 mL) for 20 hours at room temperature and then cooled to 5° C. in ice-water bath. The mixture was stirred for an additional 7 h. at which point the solid 7 was collected by vacuum filtration. The flask and filter cake were rinsed with H2O (0.32 vol) and Toluene (3.56 vol). After drying under reduced pressure at 70° C. for 18 h, the 7 was obtained as a white solid with 92.0% recovery. The overall achiral UHPLC purity was 99.92%. The 1HNMR of this 7 matched earlier 1HNMRs.

Conversion of Compound 7 to Compound 8:

A slurry was prepared from Compound 7 (50.06 g, 0.136 mol, 1.0 equivalent) and water (500.00 mL, 10.0 vol). To the stirred batch, 50% aqueous NaOH (30.8 mL, 0.58 mol, 4.3 equivalents) was added in one portion (pH≥13). The batch was stirred for 0.5 h. and methyl tert-butyl ether (100 ml, 2 volumes) was added, and the biphasic mixture was stirred for an additional 0.5 h. Following phase separation, the organic layer was separated and retained. The resultant aqueous layer was agitated for 1 h with methyl tert-butyl ether (100 ml, 2 volumes). Following phase separation, the aqueous layer was discarded. The two organic layers were combined and agitated for 0.25 h with water (50 ml, 1 volume), whereupon the aqueous layer was removed and discarded. The solution was diluted with isopropanol (268 ml, 7.33 volumes) and the batch gradually warmed to 500 C. The batch was then carefully concentrated under reduced pressure (26"-28" Hg) to a volume of c.215 ml (4.3 volumes).

The room temperature solution was treated with water (215 ml, 4.30 vol) and L-Aspartic Acid (36.10 g, 0.2714 mol, 2.0 equivalents) was added to the batch. The reaction mixture was held overnight at 20° C. The batch was gradually warmed to 40° C. and passed through a fritted funnel. The filtrate was then charged back to the reactor, and rinsed with isopropanol (50 mL, 1.0 vol). The batch was further warmed to 50° C. and concentrated under reduced pressure (26-28 In Hg) to 215 mL (4.30 vol). The mixture was sequentially azeotropically dried with Isopropanol (6×293 ml, 5.87 vol), and concentrated under reduced pressure to a volume of 215 mL (4.30 vol each time). The batch was diluted with Isopropanol (176 mL, 3.52 vol) and 95% Ethanol (168 mL, 3.37 vol) and cooled to 5° C. The batch was agitated at 5° C. for 4 h. The resulting crystalline solid was collected by filtration over a fritted funnel and washed with cold 95% Ethanol (132 mL, 2.64 vol). After drying under reduced pressure at 35° C. for 64 h, 64.43 g (88.4%) of the desired Compound 8 was obtained as a white crystalline solid with a melting point of 187° C. (by DSC). The overall UHPLC purity was 100%. 1H NMR (D20): 7.39-7.24 (m, 5H), 3.83 (dd, J=8.8, 3.6 Hz, 1H), 3.58 (sextet, J=6.8 Hz, 1H), 2.89 (dd, J=6.8, 1.2 Hz, 2H), 2.76 (dd, J=17.6, 4.0 Hz, 1H), 2.61 (dd, J=17.2, 8.8 Hz, 1H), 1.25 (d, J=6.8 Hz, 3H).

SCHEME 5: Levoamphetamine Salts by HCl process

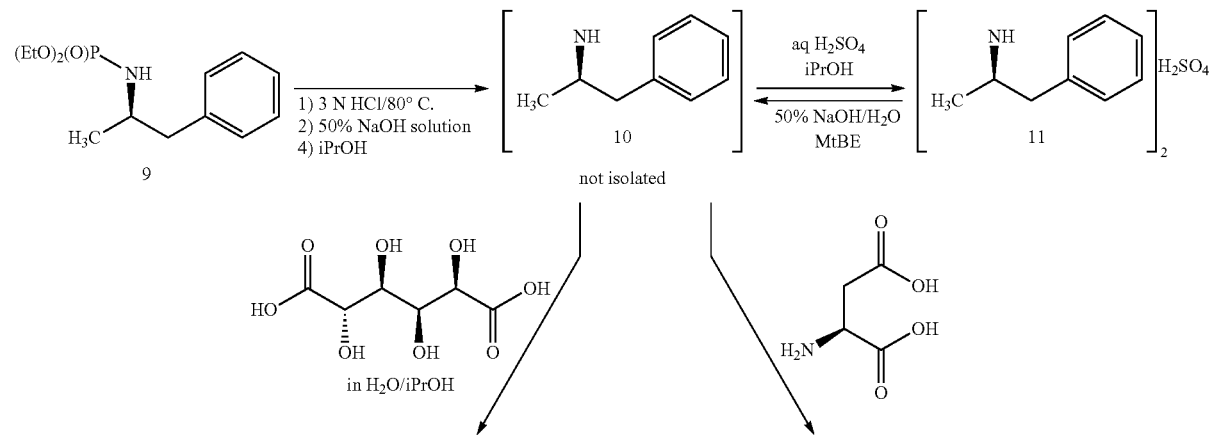

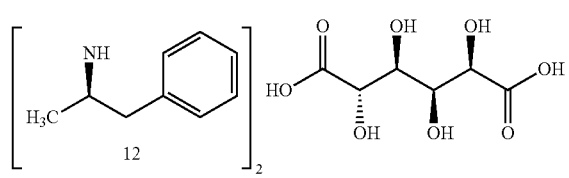

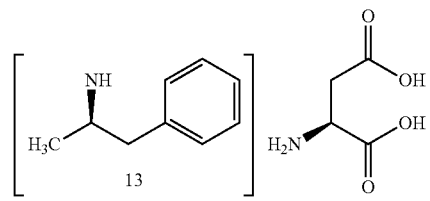

Conversion of Compound 9 to Compound 10:

To Compound 9 (100.1 g, 369 mmol, 1.0 equivalent; containing 0.03% regioisomer; chiral purity: 99.5% levorotary isomer) was added 3M aqueous HCl (182 mL of water followed by 60 mL (730 mmoL; 1.97 equivalents) of concentrated HCl solution), the resultant mixture was heated to 80° C. and held for 1.5 h. The mixture was cooled to room temperature and toluene (167 mL 1.7 volumes) was added and the biphasic batch was stirred. The organic layer was removed, and the pH of the remaining aqueous layer was adjusted to 13 with 50% aqueous NaOH (83.7 ml, 1.58 moL, 4.3 equivalents). The mixture was twice extracted with methyl tert-butyl ether (117 ml, 1.17 volumes). The combined organic extract was washed with water (85 ml, 0.85 volumes) and then diluted with isopropanol (500 ml, 5.0 volumes). The batch was warmed (45° C.-50° C.), and carefully concentrated under reduced pressure (26"-28" Hg, vacuum) affording 360 ml of the desired Compound 10 dissolved in isopropanol which was used "as is".

Conversion of Compound 10 to Compound 11:

A room temperature solution of Compound 10 dissolved in isopropanol (360 ml total volume) was treated with water (16.0 ml, 0.16 volumes) followed by the careful addition of a pre-mixed solution of concentrated sulfuric acid (9.9 ml, 0.5 equivalents), isopropanol (65 ml, 0.65 volumes) and water (31 ml, 0.31 volumes) carefully maintaining the temperature no higher than 40-45° C. Additional isopropanol was added (78.0 ml, 0.78 volumes) and the solution warmed to 80° C. at which point water (59 ml. 0.59 volumes) was added. The batch was maintained therein for 1 h. The reaction was cooled to 50° C. over a 6 h, cooled to 20° C. over 5 h and maintained there for 4 h. Isopropanol (646 ml, 6.46 volumes) was added, and the reaction mixture was cooled to 5° C. and agitated there for 6 h. The solid was filtered over a Buchner funnel and washed with cold isopropanol/water (11:1). After drying (26"-28" Hg, 35° C.) for 24 h, the desired compound 11 (53.94 g, 79.3%) was obtained as a white solid. The isolated 11 had a decomposition point of 344° C. (by DSC) and was >99.5% pure (non-chiral UHPLC) and >99.9% levorotary isomer (chiral HPLC). The specific rotation was −230 (c=40 mg/ml in water); 1HNMR (D20): 7.38-7.25 (m, 10H), 3.57 (sex, J=13.6, 6.8 Hz, 2H), 2.88 (d, J=6.8 Hz, 4H), 1.24 (d, J=6.8 Hz, 6H).

Conversion of Compound 11 to Compound 12 a. Compound 11 (20.04 g, 54 mmoL, 1 equivalent) was slurried in water (200 ml, 10 volumes) at ambient temperature followed by the addition of 50% aqueous NaOH (12.3 ml, 230 mmol, 4.3 equivalents) resulting in a white cloudy suspension. The batch was stirred for 0.5 h and the aqueous layer was agitated for 0.5 h with methyl tert-butyl ether (40 ml, 2 volumes). Following phase separation, the organic layer was separated and retained. The resultant aqueous layer was agitated for 0.5 h with methyl tert-butyl ether (40 ml, 2 volumes. Following phase separation, the combined organic layers were washed with water (20.0 ml, 1 volume).

The organic layer was diluted with isopropanol (146 ml, 7.33 volumes) and the batch gradually warmed to 50° C. The batch was then concentrated under reduced pressure (26"-28" Hg) to 46 ml (4.3 volumes) and cooled to room temperature.

b. A stirred slurry of calcium saccharate tetrahydrate (18.44 g, 57 mmoL, 0.53 equivalents) in water (31 ml, 1.54 volumes) and was cooled (5° C.) and carefully treated over 0.5 h with a solution prepared from concentrated sulfuric acid (3.1 ml, 0.53 equivalents) in water (5.9 ml, 0.29 volumes). The resultant slurry was agitated for 0.25 hours, then warmed to room temperature and stirred for 1 h. This slurry was diluted with isopropanol (154 ml, 7.71 volumes) and agitated for 1 hour. The slurry was then filtered through a fritted funnel and the filter-cake rinsed with isopropanol (62 ml, 3.12 volumes)

c. The saccharic acid filtrate was gradually added to the to the crude Compound 10 isopropanol solution resulting in a white slurry. This slurry was agitated for 1.5 hours at room temperature and then gradually warmed and held at 55° C. Water (8.0 ml, 0.4 volumes) was slowly added resulting in a clear solution. This solution was agitated for 2 hours, and the temperature was reduced to 45° C. over 3 h at which point the product began to crystallize. The batch was gradually cooled to 5° C. over 5 h and held there for 7 h. The white solid was collected via filtration through a fritted funnel and the solid rinsed with isopropanol; (35 ml, 1.76 volumes). Drying under reduced pressure (26"-28" Hg, 65-70° C.) afforded 20.33 g (77.8%) of the desired Compound 12 as a white crystalline solid. The isolated 12 was >99.8% pure (by non-chiral UHPLC) and >99.9% levorotary isomer (chiral HPLC). The specific rotation was −18.50 (c=40 mg/ml in water). 1HNMR (D20): 7.38-7.24 (m, 10H), 4.06 (d, J=2.8 Hz, 1H), 4.04 (d, J=4.8 Hz, 1H), 4.014-3.99 (m, 1H), 3.86 (t, J=4.4 Hz, 1H), 3.57 (sextet, J=6.8 Hz, 2H), 2.88 (d, J=7.6 Hz, 4H), 1.24 (d, J=6.8 Hz, 6H).

Conversion of Compound 11 to Compound 13

A slurry was prepared from Compound 11 (50.06 g, 0.136 mol, 1.0 equivalent) and water (500.00 mL, 10.0 vol). To the batch, 50% aqueous NaOH (30.8 mL, 0.58 mol, 4.3 equivalents) was added in one portion (pH≥13). The batch was stirred for 0.5 h and methyl tert-butyl ether (100 ml) was added. The agitation was and was continued for 0.5 h and the layers were separated, and the organic layer was retained. The remaining aqueous layer was agitated for 1 h with fresh methyl tert-butyl ether (100 ml). Following phase separation, the aqueous layer was discarded. The two organic layers were combined and washed with water (50 ml) and the aqueous layer was removed and discarded. The combined organic extracts were diluted with isopropanol (275 ml) and the batch gradually warmed to 50° C. The batch was then carefully concentrated under reduced pressure (26"-28" Hg) to a volume of about 210 ml.

To the room temperature organic solution was added water (215 ml, 4.30 vol) and solid L-Aspartic Acid (36.10 g, 0.27 mol, 2.0 equivalents) was added to the batch. The batch was gradually warmed to 40° C. where most of the solids dissolved. The hazy batch was clarified by filtration through a line filter. The filtrate was then charged back to the reactor, and rinsed with isopropanol (50 mL, 1.0 vol). The batch was further warmed to 50° C. and concentrated under reduced pressure (26-28 In Hg) to 215 mL (4.30 vol). The mixture was sequentially azeotropically dried with Isopropanol (6×293 ml, 5.87 vol), and concentrated under reduced pressure to a volume of 215 mL (4.30 vol each time). The batch was diluted with Isopropanol (175 mL, 3.52 vol) and 95% Ethanol (168 mL, 3.37 vol) and cooled to 5° C. The batch was agitated at 5° C. for 4 h. The resulting crystalline solid was collected by filtration over a fritted funnel and washed with cold 95% Ethanol (132 mL, 2.64 vol). After drying under reduced pressure at 35° C. for 64 h, 64.43 g (88.4%) of the desired Compound 13 was obtained as a white crystalline solid. The overall purity was 99.8% (by non-chiral UHPLC) and was 99.5% levorotary isomer (chiral HPLC). 1H NMR (D20): 7.39-7.24 (m, 5H), 3.83 (dd, J=8.8, 3.6 Hz, 1H), 3.58 (sextet, J=6.8 Hz, 1H), 2.89 (dd, J=6.8, 1.2 Hz, 2H), 2.76 (dd, J=17.6, 4.0 Hz, 1H), 2.61 (dd, J=17.2, 8.8 Hz, 1H), 1.25 (d, J=6.8 Hz, 3H).

diluted with fresh toluene (375 mL, 7.5 vol). The batch was warmed to 80° C. and agitated at 80° C. for 1 h before being gradually cooled to 50° C. over the next 2 hours at which point the 11 crystallized. The batch was cooled to room temperature and held a that temperature for 4 to 24 hours. Finally, the slurry was cooled to 5° C. and held at that temperature for about 12 h. The resulting crystalline solid was collected by filtration and rinsed with cold toluene (2×3.0 vol). After drying under reduced pressure at 35° C. for 24 h compound 11 was obtained as a white crystalline solid in quantitative yield. The overall UHPLC purity was 99.92% AUC. 1HNMR (D20): 7.39-7.25 (m, 10H), 3.58 (sextet, J=6.8 Hz, 2H), 2.89 (dd, J=6.8, 1.6 Hz, 4H), 1.23 (d, J=6.4 Hz, 6H). The solid contained about 5% mol % Toluene based on 1HNMR analysis.

Compound 11 from the above procedure was slurried in a mixture of water (3 mL) and toluene (57 mL) for 20 hours at room temperature and then cooled to 5° C. in ice-water bath. The mixture was stirred for an additional 7 h. at which point the solid 11 was collected by vacuum filtration. The flask and filter cake were rinsed with H₂O (0.32 vol) and toluene (3.56 vol). After drying under reduced pressure at

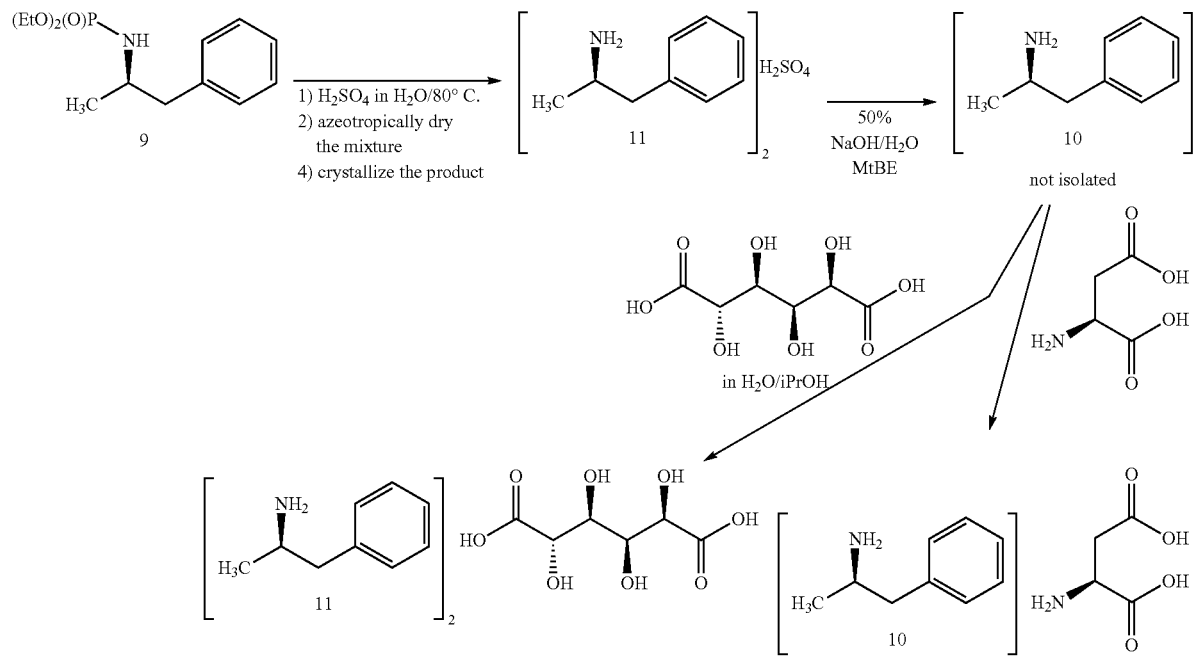

Scheme 6: Levoamphetaminesalts by H₂SO₄ process

Conversion of Compound 9 to Compound 11:

To a slurry of Compound 9 (50.00 g, 0.184 mol, 1.0 equivalent, <0.1% of the regioisomeric isomer; 99.5% levorotary isomer) in water (150.00 mL, 3.0 vol) was added concentrated H2SO4 (95-98%, 6.19 mL, 0.11 mol, 0.6 equivalents). The slurry was heated to 80° C. at which point the solids dissolved. The batch was agitated for 16 h, after which point the IPC by HPLC showed >99% conversion to Compound 11. The batch was then gradually cooled to 20° C. at which point toluene (250.00 mL, 5.0 vol) was added. The batch was concentrated under vacuum (26-28 In Hg) to about 125.00 mL (2.50 vol). This process (addition of toluene and concentration) was repeated three more times until residual water content of 0.11 weight % was obtained based on KF titration (target<3 weight %). The mixture was 70° C. for 18 h the 3 was obtained as a white solid with 92.0% recovery. The overall achiral UHPLC purity was 99.92%. This material was >99.9% of the levorotary isomer by chiral HPLC analysis and the specific rotation consistent with earlier samples. The 1HNMR of this 11 matched earlier 1HNMRs.

Conversion of Compound 11 to Compound 12 a. Compound 11 (20.04 g, 54 mmoL, 1 equivalent) was slurried in water (200 ml, 10 volumes) at ambient temperature followed by the addition of 50% aqueous NaOH (12.3 ml, 230 mmol, 4.3 equivalents) resulting in a white cloudy suspension. The batch was stirred for 0.5 h and methyl tert-butyl ether (40 ml, 2 volumes) was added. The biphasic mixture was mixed for 0.5 h and then the phases were allowed to separate. The pH of the remaining aqueous layer was confirmed to be basic (pH>12), and a second charge of methyl tert-butyl ether was added, and the biphasic mixture was mixed for 0.5 h at which point the mixing was stopped and the layers were allowed to separate. Following phase separation, the combined organic layers were washed with water (20.0 ml, 1 volume). The separated organic layer was diluted with isopropanol (146 ml, 7.33 volumes) and the batch gradually warmed to 50° C. The batch was then concentrated under reduced pressure (26"-28" Hg) to about 40 ml (4.3 volumes) and cooled to room temperature.

b. A slurry was prepared from calcium saccharate tetrahydrate (18.44 g, 57 mmoL, 0.53 equivalents) and water (31 ml, 1.54 volumes). The resultant slurry was cooled (5° C.) and carefully treated over 0.5 h with a solution prepared from concentrated sulfuric acid (3.1 ml, 0.53 equivalents) in water (5.9 ml, 0.29 volumes). The resultant chilled slurry was agitated for 0.25 h, warmed to RT and further stirred for 1 h. This slurry was diluted with isopropanol (154 ml, 7.71 volumes) and agitated for 1 h. The slurry was then filtered through a fritted funnel and the filter-cake rinsed with isopropanol (62 ml, 3.12 volumes)

c. The saccharic acid filtrate was gradually added to the to the crude Compound 10 in isopropanol solution resulting in a white slurry. This slurry was agitated for 1.5 h at RT and then gradually warmed and held at 55° C. Water (8.0 ml, 0.4 volumes) was slowly added resulting in a clear solution. This solution was clarified by filtration and then the temperature was reduced to 45° C. over 3 h whereupon compound 12 began to crystallize. The gently stirred batch was gradually cooled to 5° C. over 5 h and held there for 7 h. The white solid was collected via filtration through a fritted funnel and the solid rinsed with isopropanol; (35 ml, 1.76 volumes). Drying under reduced pressure (26"-28" Hg, 65-70° C.) afforded 20.33 g (77.8%) of the desired Compound 12 as a white crystalline solid. The isolated 12 was >99.8% pure (by non-chiral UHPLC) and >99.9% levorotary isomer (chiral HPLC). 1HNMR (D20): 7.38-7.24 (m, 10H), 4.06 (d, J=2.8 Hz, 1H), 4.04 (d, J=4.8 Hz, 1H), 4.014-3.99 (m, 1H), 3.86 (t, J=4.4 Hz, 1H), 3.57 (sextet, J=6.8 Hz, 2H), 2.88 (d, J=7.6 Hz, 4H), 1.24 (d, J=6.8 Hz, 6H)

Conversion of Compound 11 to Compound 13:

A slurry was prepared from Compound 11 (50.06 g, 0.136 mol, 1.0 equivalent) and water (500.00 mL, 10.0 vol) and the stirrer commenced. To the stirred batch, 50% aqueous NaOH (30.8 mL, 0.58 mol, 4.3 equivalents) was added in one portion (pH≥13). The batch was stirred for 0.5 h, at which point methyl tert-butyl ether (100 ml) was added and the stirring was continued for 0.5 h. Following phase separation, the organic layer was separated and retained. The resultant aqueous layer was agitated for 1 h with methyl tert-butyl ether (125 ml) and the layers were allowed to separate. Following phase separation, the aqueous layer was discarded. The two organic layers were combined and agitated for 0.25 h with water (50 ml), whereupon the aqueous layer was removed and discarded. The solution was diluted with isopropanol (270 ml) and the batch gradually warmed to 50° C. The batch was then carefully concentrated under reduced pressure (26"-28" Hg) to a volume of about 225 ml.

The room temperature batch was treated with water (215 ml, 4.30 vol) and solid L-Aspartic Acid (36.10 g, 0.27 mol, 2.0 equivalents) was added to the batch. The batch was gradually warmed to 40° C. and the hazy solution was passed through a fritted funnel. The filtrate was then charged back to the reactor and rinsed with isopropanol (50 mL). The batch was further warmed to 50° C. and concentrated under reduced pressure (26-28 In Hg) to 215 mL (4.30 vol). The mixture was azeotropically dried with Isopropanol (6×293 ml) and concentrated under reduced pressure to a volume of about 215 mL (4.30 vol each time). The batch was diluted with Isopropanol (175 mL, 3.52 vol) and 95% Ethanol (168 mL, 3.37 vol) and the stirred batch began to crystallize. The slurry was cooled to 5° C. and was stirred for 4 h. The resulting crystalline solid was collected by filtration over a fritted funnel and washed with cold 95% ethanol (132 mL, 2.64 vol). After drying under reduced pressure at 35° C. for 64 h, 64.43 g (88.4%) of the desired Compound 13 was obtained as a white crystalline solid. The overall purity was 99.8% (by non-chiral UHPLC) and was 99.5% levorotary isomer (chiral HPLC). The spectral data was identical to earlier samples of 13.

Schemes for Obtaining Highly Pure Phosphoramidate

Experimental Introduction: Processes for obtaining highly pure phosphoramidate compounds may be found in U.S. Pat. Nos. 9,278,904, 9,321,794, 9,657,041, U.S. patent Ser. No. 10/087,202, and U.S. patent Ser. No. 11/123,310, incorporated herein by reference herein in their entirety. Highly pure phosphoramidate compounds may be obtained using chiral processes to obtain dextro- or levo-isomers, and may be obtained using racemic processes to obtain a mixture of isomers.

Processes for Obtaining Phosphoramidate

The process provides for the synthesis of aziridine phosphoramidate compounds in specified solvents at specified temperatures, and then converting to a novel aryl or aryl-alkyl phosphoramidate precursors using a modified organometallic compound such as a organocopper reagent, where the novel aryl or aryl-alkyl phosphoramidate precursor is then easily converted to the target compounds using known reactions, e.g. acidification, methylation of the nitrogen followed by dephosphorylation, etc. to obtain the desired amphetamine, dexamphetamine, methamphetamine, derivatives of these, including their salts, and novel precursors and intermediates obtained thereby.

In one preferred aspect of the process the invention provides a synthetic pathway to amphetamine derivatives using an aziridine based process with an organometallic compound by heating the reactants in a first step, and then adding as a second step the Grignard reagent in a dosage controlled fashion. In a preferred embodiment of the chiral process, the reaction is heated to above 40° C., preferably above about 45° C., and more preferably above about 48° C. In one embodiment, the temperature is maintained from 48-51° C. for about 30 minutes and then brought to room temperature.

In preferred aspects of the phosphoramidate process, the process comprises wherein the phosphoramidate is prepared by providing a compound of Formula 4 (chiral) or Compound 14 (racemic):

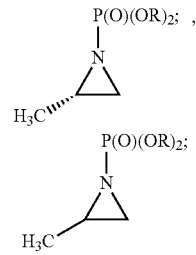

wherein R is alkyl or aryl and reacting the compound of Formula 4 or 14 with phenylmagnesium halide and a copper halide catalyst under solvent and temperature conditions effective to produce a compound of Formula 5 (chiral) or 6 (racemic) in a purity substantially free of any regioisomeric impurities,

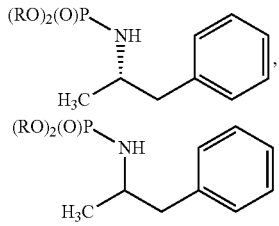

In preferred aspects of the phosphoramidate process, the regioisomeric purity is >99% and the regioisomer is <0.1%.

In preferred aspects of the phosphoramidate process, R=methyl, ethyl, isopropyl or phenyl.

In preferred aspects of the phosphoramidate process, the copper halide catalyst is CuCl, $CuCl_2$, CuBr or Copper nanoparticles.

In preferred aspects of the phosphoramidate process, the solvent is an organic ether.

In preferred aspects of the phosphoramidate process, the solvent is tetrahydrofuran or 2-methyltetrahydrofuran.

In preferred aspects of the phosphoramidate process, treating is carried out at a temperature of from about −10° C. to about 70° C.

General Process

In yet another preferred embodiment of the process, there is provided a process for the synthesis of aryl or aryl-alkyl phosphoramidate compound comprising the step of performing a stereo-specific cuprate addition reaction upon an aziridine phosphoramidate compound to obtain the aryl or aryl-alkyl phosphoramidate amphetamine precursor.

Solvent Extraction

In yet another preferred embodiment of the chiral process, there is provided a process for solvent extraction of compounds 5a-d from a mixture of compounds 5a-d and 6a-d, comprising the step of performing a solvent extraction using a mixture of two or more solvents wherein at least one of the two or more solvents is Aziridine Precursor Process—Preparation of (S)-(dialkyl or diaryl) (2-methyl-aziridin-1-yl)phosphonate (Compound 4)

A 500 mL, 3-neck flask equipped with an overhead mechanical stirrer and pressure equalizing addition funnel is charged with L-alaninol (12.5 g, 166.4 mmol), triethylamine (29 mL, 208 mmol, 1.25 equiv) and dichloromethane (125 mL). The reaction solution is cooled to +2° C. and treated with di(alkyloxy or diaryloxy)phosphoryl chloride (20 mL, 183 mmol, 1.10 equiv) over 40 minutes while maintaining an internal temperature <+8° C. The reaction mixture is stirred with ice bath cooling for 1 hour at which point the reaction is complete by TLC analysis (silica gel, 93:6:1 DCM/MeOH/$NH_4$OH and 6/3/1 $CHCl_3$/MeOH/$NH_4$OH; $KMnO_4$ stain). Additional triethylamine (25.5 mL, 182.5 mmol, 1.10 equiv) is added to the reaction mixture and methanesulfonyl chloride (14.9 mL, 191 mol, 1.15 equiv) was added drop-wise over 45 minutes while maintaining an internal temperature <+10° C. The resulting reaction mixture is stirred with ice bath cooling for 1.0 hour after which time TLC analysis indicated the reaction is complete. Potassium hydroxide solution (3 M, 220 mL, 650 mmol, 4.0 equiv) is slowly added to the stirred reaction mixture while maintaining an internal temperature <+16° C. The reaction is continued with agitation for 6 hours, after which time the aqueous layer is separated and discarded. Saturated $NaHCO_3$ solution (35 mL) is added and the biphasic mixture heated to 40-42° C. Distillation is started and a first fraction of 90 mL of dichloromethane is collected. When the temperature reaches 50° C., a second fraction is collected until the batch temperature is 65° C. The mixture is heated at 65° C. for another 1 hour and then cooled to ambient temperature. Dichloromethane (90 mL) is added and the mixture stirred for 10 minutes before separation. The dichloromethane layer is concentrated under reduced pressure. The residue is dissolved in heptanes (15 mL) and concentrated under reduced pressure to remove the residual water. This azeotropic drying is repeated two more times. The resulting 4 is obtained as a light yellow liquid (20.9 g, 30-81% yield, 95.40% GC purity). A colorless sample is prepared by short path distillation (80-85° C.@15 mm Hg vacuum). Optical rotation c=1.00, ethanol, 25.0° C., +39.3.degree. .sup.1H NMR (300 MHz, $CDCl_3$) .delta. 3.80 (s, 3H), 3.76 (s, 3H), 2.65-2.50 (m, 1H), 2.42-2.31 (m, 1H), 1.92 (dt, J=3.6, 1.2 Hz, 1H), 1.28 (dd, J=5.4, 1.2 Hz, 3H).

Phosphoramidate Production

Process—Preparation of (S)-(dialkyl or diaryl) (1-phenyl-propan-2-yl)phosphoramidate (5a)

A 100 mL 3-neck flask is charged with 4 (4.0 g, 24.2 mmol), THF (25 mL) and CuCl (28 mg, 1 mol %) and the stirrer is started. The mixture is heated to 48° C. A pressure equalizing addition funnel is charged with PhMgCl (2M in THF, 13 mL) and the solution is added slowly while maintaining an internal temperature between 48-51° C. The reaction is stirred at 48-51° C. for an additional 30 minutes and then cooled to ambient temperature. The reaction is quenched by slow addition to a cooled (15° C.) solution of saturated aqueous ammonium chloride in water (50/50 v/v, 40 mL) while maintaining the temperature below 20° C. Heptanes (40 mL) is used to rinse the reactor and the rinse solution is transferred to the quenched reaction mixture. The mixture is agitated for 5 minutes, allowed to separate for 20 minutes then the aqueous phase is discarded. The organic phase washed with deionized water (10 mL) and the organic phase concentrated under reduced pressure to give an oil. The residue dissolved in heptanes (50 mL) and the solution concentrated under reduced pressure. The residue crystallized from methyl tert-butyl ether (1 g/3 mL), filtered and dried to give 5a as white needles (3.29 g; 60.2% yield), with 99.89% GC purity containing 0.05% 6a. mp 86-88° C. Optical rotation c=1.00, ethanol, 25.0° C., +29.7.degree. .sup.1H NMR (300 MHz, $CDCl_3$) .delta. 7.32-7.17 (m, 5H), 3.66 (d, J=6.4 Hz, 3H), 3.50-3.83 (m, 1H), 2.71 (d, J=6.6 Hz, 2H), 2.45 (m, 1H), 1.15 (d, J=6.6 Hz, 3H).

The use of other copper salts (CuF, $Cu(OAc)_2$, $Cu(acac)_2$, $Cu(OMe)_2$ and Copper turnings) in conversion to 4 to 5, conducted under the established procedure afforded 5 in comparable isolated yield, GC purity and devoid of the undesired regioisomer.

Definitions

Definition: Substituted Amphetamines

Substituted Amphetamines means the class of compounds that include the parent compound, amphetamine, and compounds that feature a phenethylamine core with a methyl group attached to the alpha carbon and from 1-3 substitutions at various locations on the alpha-methyl-phenethylamine parent.

Substitutions contemplated herein include without limitation alpha-position substituents comprising alkyl groups as defined herein but especially C1-C3 alkyl, N-position substituents comprising alkyl groups as defined herein but especially C1-C3 alkyl, beta-position substituents comprising alkyl groups as defined herein but especially hydroxy or keto-, phenyl substituents at positions 2-5 comprising any alkyl or aryl group as defined herein, and combinations of substituents at one or more positions thereof.

Substituted Amphetamines also includes the optical isomers, such as D-amphetamine or L-amphetamine, of such compounds as well as enantiomerically pure compositions, and racemic mixtures in both equal and unequal amounts thereof. Enantiomeric forms, such as R—, S—, R—R—, S—S—, and R—S—, and prodrug forms, such as for example lisdexamfetamine, are also contemplated as included within the inventive subject matter.

Definition: Highly Pure

Highly pure means a substance that has >99% of only one type of fundamental unit. A highly pure phosphoramidate compound as used herein refers to a substance that has >99% of an (S or R,S) (dialkyl or diaryl)(1-phenylpropan-2-yl) phosphoramidate compound. A highly pure substituted amphetamine as used herein refers to a substance that has >99% of a (S, R, S,S, R,R or R,S) (dialkyl or diaryl)(1-phenylpropan-2-amine) or a salt, solvate, or hydrate thereof. In one non-limiting preferred embodiment, the range of the percentage purity is >99.2%, or >99.3%, or 99.4%, or 99.5%, or 99.6%, or 99.7%, or 99.8%, or 99.9% pure. In another non-limiting preferred embodiment, the range of the percentage purity is >99.92%, or >99.93%, or >99.94%, or >99.95%, or >99.96%, or >99.97%, or >99.98%, or >99.99%. A highly pure compound means a compound that shares the same chemical name, chemical structure, melting point, boiling point, optical rotation, HPLC peak, GC characteristics, solvents, crystallization structure and characteristics, chirality, and NMR results.

Definition: Organic Moieties

Alkyl means any $C_1$-$C_{10}$ straight or branched chain alkyl, wherein said alkyl, is optionally substituted with $C_1$-$C_6$ alkyl, $C_2$-$C_6$ alkenyl, hydroxy, amino, halo, haloalkyl, thiocarbonyl, ester, thioester, alkoxy, alkenoxy, cyano, nitro, imino, alkylamino, aminoalkyl, sulfhydryl, thioalkyl, or sulfonyl.

Aryl means any alicyclic or aromatic, mono-, bi- or tricyclic, carbo- or heterocyclic ring, wherein the ring is either unsubstituted or substituted with one or more substituent(s) independently selected from the group including, but not limited to, alkylamino, amido, amino, aminoalkyl, azo, benzyloxy, $C_1$-$C_9$ straight or branched chain alkyl, $C_1$-$C_9$ alkoxy, $C_2$-$C_9$ alkenyloxy, $C_2$-$C_9$ straight or branched chain alkenyl, $C_3$-$C_8$ cycloalkyl, $C_5$-$C_7$ cycloalkenyl, carbonyl, carboxy, cyano, diazo, ester, formanilido, halo, haloalkyl, hydroxy, imino, isocyano, isonitrilo, nitrilo, nitro, nitroso, phenoxy, sulfhydryl, sulfonylsulfoxy, thio, thioalkyl, thiocarbonyl, thiocyano, thioester, thioformamido, trifluoromethyl, and carboxylic and heterocyclic moieties, including alicyclic and aromatic structures; wherein the individual ring size is 5-8 members; wherein said heterocyclic ring contains 1-6 heteroatom(s) independently selected from the group consisting of O, N, and S; and wherein said aromatic or tertiary alkyl amine is optionally oxidized. Useful carbo- and heterocyclic rings include without limitation phenyl, benzyl, naphthyl, indenyl, azulenyl, fluorenyl, anthracenyl, indolyl, isoindolyl, indolinyl, benzofuranyl, benzothiophenyl, indazolyl, benzimidazolyl, benzthiazolyl, tetrahydrofuranyl, tetrahydropyranyl, pyridyl, pyrrolyl, pyrrolidinyl, pyridinyl, pyrimidinyl, purinyl, quinolinyl, isoquinolinyl, tetrahydroquinolinyl, quinolizinyl, furyl, thiophenyl, imidazolyl, oxazolyl, benzoxazolyl, thiazolyl, isoxazolyl, isotriazolyl, oxadiazolyl, triazolyl, thiadiazolyl, pyridazinyl, pyrimidinyl, pyrazinyl, triazinyl, trithianyl, indolizinyl, pyrazolyl, pyrazolinyl, pyrazolidinyl, thienyl, tetrahydroisoquinolinyl, cinnolinyl, phthalazinyl, quinazolinyl, quinoxalinyl, naphthyridinyl, pteridinyl, carbazolyl, acridinyl, phenazinyl, phenothiazinyl, and phenoxazinyl. R may also be in certain preferred embodiments any $C_2$-$C_1$ straight or branched chain alkenyl or $C_1$-$C_1$ alkoxy, unsubstituted or optionally substituted with moieties listed above. Non-limiting examples of substituted amphetamines as described herein include: .alpha.-Methyl-phenethylamine; .beta.-Ketoamphetamine; .beta.-Hydroxyamphetamine, (1S, 2S)-; .beta.-Hydroxyamphetamine, (1R,2S)-; .alpha.-Methylamphetamine; N-Propylamphetamine; N-Methylamphetamine, (1R,2S)-; N-iso-Propylamphetamine; N-Ethylamphetamine; N-(2-chlorobenzyl)-1-phenylpropan-2-amine; 4-Methylthioamphetamine; 4-Methyl amphetamine; 4-Methoxyamphetamine; 4-Iodoamphetamine, 4-Hydroxyamphetamine; 4-Fluoroamphetamine; 4-Ethoxyamphetamine; 4-Chloroamphetamine; 4-Bromoamphetamine; 3-Trifluoromethyl amphetamine; 3-Methylamphetamine; 3-Fluoroamphetamine; 2-Methylamphetamine; 2-Fluoroamphetamine; .beta.-Keto-N-methylamphetamine; .beta.-Keto-N-ethylamphetamine; 13-Hydroxy-N-methyl amphetamine, (1S,2S)-; .beta.-Hydroxy-N-methylamphetamine, (1R,2S)-; .alpha.,.beta.-Dimethylamphetamine; X,X-Dimethoxyamphetamine; N-Methyl-a-methylamphetamine; N-Methyl-N-propargylamphetamine, (R)—N-Benzyl-N-methylamphetamine; N,N-Dimethylamphetamine, 4-Methyl-N-methylamphetamine; 4-Methoxy-N-methylamphetamine; 4-Methoxy-N-ethylamphetamine; 4-Hydroxy-N-methylamphetamine; 4-Fluoro-N-methylamphetamine; 4-Chloro-a-methylamphetamine; 3-Trifluoromethyl-N-ethylamphetamine, (S)-; 3-Trifluoromethyl-N-ethylamphetamine; 3-Methoxy-4-methylamphetamine; 3,4-Methylenedioxyamphetamine; 3,4-Dimethylamphetamine; 3,4-Dihydroxyamphetamine; 2-Chloro-a-methylamphetamine; .beta.-Keto-N,N-dimethylamphetamine; .beta.-Keto-N,N-di ethyl amphetamine; .beta.-Keto-4-methyl-N-methylamphetamine; .beta.-Keto-4-methoxy-N-methylamphetamine; .beta.-Keto-4-fluoro-N-methylamphetamine; .beta.-Keto-4-bromo-N-methylamphetamine; .beta.-Keto-3-chloro-N-tert-butylamphetamine; .beta.,4-Dihydroxy-N-methylamphetamine; .beta.,3,4-Trihydroxyamphetamine; (R)—X,X,X-Trimethoxyamphetamine; 4,5-Methylenedioxy-3-methylamphetamine; 3-Methoxy-4,5-methylenedioxyamphetamine; 3,4-Methylenedioxy-N-methylamphetamine; 3,4-Methylenedioxy-N-hydroxyamphetamine; 3,4-Methylenedioxy-N-ethylamphetamine; 3,4-Methylenedioxy-2-methyl amphetamine; 2,5-Dimethoxy-4-trifluoromethylamphetamine; 2,5-Dimethoxy-4-propylamphetamine; 2,5-Dimethoxy-4-nitroamphetamine; 2,5-dimethoxy-4-methylthioamphetamine; 2,5-Dimethoxy-4-methylamphetamine; 2,5-Dimethoxy-4-iodoamphetamine; 2,5-Dimethoxy-4-fluoroethylamphetamine; 2,5-Dimethoxy-4-fluoroamphetamine; 2,5-Dimethoxy-4-ethylamphetamine; 2,5-Dimethoxy-4-chloroamphetamine; and 2,5-Dimethoxy-4-bromoamphetamine Definition: Impurity Impurity means product-related impurity(s), process-related impurity(s), and other impurity(s). Impurities that are structurally similar to the active pharmaceutical ingredient ("API") are commonly referred to as "product-related impurities." In the case of APIs containing chiral centers where one enantiomer shows therapeutic effect, while the other enantiomer shows either no effect, minimal effect, or an undesirable effect, the latter enantiomer represents a type of product-related impurity, commonly referred to as an "enantiomeric impurity."

Impurities that are not structurally similar to the API, and are introduced by the process(es) used to make the API, are commonly referred to as "process-related impurities." Process-related impurities can comprise such things as unreacted starting materials, materials added to purify the API, by-products of side reactions, and the like, which do not structurally resemble the API. Process-related impurities may also comprise residual solvents and heavy metals. However, due to their known toxic properties, residual solvents and heavy metals are often considered apart from other types of process-related impurities. Although the copper and magnesium used in the reaction should not in theory carry forward into the product, even producing a bluish color if the wash step is ineffective and providing an indicator of a problem, the amphetamine product may comprise copper impurities at less than 20 ppm and magnesium impurities at less than 20 ppm. Thus, in one aspect, the invention provides a pharmaceutical composition or drug substance preparation containing dextroamphetamine, i.e. (2S)-1-phenylpropan-2-amine, or a pharmaceutically acceptable salt, solvate, ester or prodrug thereof, as the API, and limited amounts of specific product-related impurities such as undesired isomers, i.e. (2R)-1-phenylpropan-2amine, and limited amounts of process-related impurities such as 2-methyl-3-phenyl-aziridine.

In one embodiment of this aspect, all of the impurities present in these compositions are limited to about 5%, 4%, 3%, 2%, 1%, or less of the total weight of the composition (i.e., [sum of weight(s) of one or more impurities]/[total weight of composition].times.100% is less than 5%, 4%, 3%, 2%, 1%, or less).

Amphetamine-type substances (ATS), like other synthetically derived compounds, can be produced by a multitude of synthetic pathways using a variety of precursors and reagents, resulting in a large number of possible contaminants (by-products, intermediates and impurities). Review articles describe the common contaminants found in preparations of amphetamine like compounds synthesized via common synthetic pathways including reductive amination, Leuckart method, Nagai method, Emde method, Birch reduction, "Moscow" method, Wacker process, "Nitrostyrene" method and the Peracid oxidation method. Forensic contaminants can facilitate identification of the synthetic route, origin of precursors and may suggest information as to the location of manufacture of these illicit drugs [Forensic Sci Int 2013 Jan. 10; 224(1-3):8-26. doi: 10.1016/j.forsciint.2012.10.040. Epub 2012 Nov. 24].

However, prior art processes produce identifiable and measurable quantities cis and trans isomers of 2-methyl-3-phenylaziridine impurities which are potentially genotoxic impurities (PGIs). Fractional distillation to reduce the impurity is difficult because the boiling point difference between cis/trans mixture of 2-methyl-3-phenylaziridine and dextroamphetamine is extremely small and the aziridines distill first. One example includes amphetamines prepared by the Emde process, which did not consider "Potential Genotoxic Impurities" (PGIs) or "DNA Reactive Impurities" when it came to market. However, it is now recognized that trace impurities causing carcinogenic, mutagenic, or teratogenic effects are a problem for patients who need to take a drug for a prolonged period. Aziridines and Epoxides are compounds that can irreversibly alkylate an amine, hydroxyl or thiol on human enzymes or enzyme receptor sites. Examples of this type of undesired reaction is the teratogenicity of the undesired isomer of Thalidomide. Historically, amphetamines have been marketed as a long-term treatment of boys aged 5 to 20 who are diagnosed with attention deficit hyperactivity disorder (ADHD). However, in contrast to existing processes, if FDA approval were sought anew, all PGI would be required to be in the parts per million levels.

Formulation compositions of amphetamine type substances have also been well described in the published art. The US Food and Drug Administration Orange Book, for example, cites a number of patents pertaining to compositions that are encompassed in approved drug applications with the earliest being approved prior to Jan. 1, 1982 and the most recent on Oct. 15, 2015. Since amphetamines are known to stimulate the central nervous system (CNS), they have been used medicinally to treat various disorders including attention deficit hyperactivity disorder (ADHD), obesity, and narcolepsy. In both children and adults with ADHD, potent CNS stimulants have been used since the 1950s as a drug treatment given either alone or as an adjunct to behavioral therapy. Amphetamines, in immediate-release and extended-release formulations are the most prescribed pharmaceutical for this purpose. The prototype of the class, racemic amphetamine (alpha-methyl phenethylamine) has been used all along and increasingly so in recent years. (Bradley C, Bowen M, "Amphetamine (benzedrine) therapy of children's behavior disorders." American Journal of Orthopsychiatry 11: 92-103 (1941). [Reference U.S. Pat. No. 7,723,305]. Subsequently, the single optical isomers (Dextroamphetamine and Levoamphetamine) have been developed for the market and then mixtures of the dextro and levo isomers were developed as extended release dosage forms.

Amphetamine type substances are also used as components of prodrugs. Older drugs in this class are still in use globally but have been removed from western formularies, including the covalent product of amphetamine with theophylline (Fenethylene) or the product of amphetamine with 2-chlorobenzyl chloride (Clobenzorex) One current example is lisdexamfetamine dimesylate.

Definition: Copper

Copper catalyst used in the process includes CuCl, $CuCl_2$, CuBr, CuF, $Cu(OAc)_2$, $Cu(acac)_2$, $Cu(Ome)_2$, copper nanoparticles, copper turnings, copper grit, copper powder, copper shot, copper foil, copper flake, copper disk, copper precipitate, copper mist, copper dust, copper granules, and copper slug. Copper nanoparticles means particles having an average diameter of about 1 nm-100 nm.

Definition: Alkyl Phosphonic Group

Alkyl Phosphonic Acid Protecting group means any group attached to the aziridine nitrogen having one or more alkyl groups attached to a phosphorous atom thereby having the formula .beta.-O—$(OR)_2$, where R1 and R2 can be the same or different, and include without limitation any alkyl, alkoxy or aryl group as defined herein, and including any and all equivalents thereof.

Definition: Solvent

Solvents, as used and exemplified herein, are not intended to be limiting and may include without limitation solvents selected from Ligroine, Pentane, Hexane, Heptane, Octane, Cyclopentane, Cyclohexane, Cycloheptane, Cyclooctane, Dichloromethane, Chloroform, Carbon tetrachloride, 1,2-Dichloroethane, 1,1,2,2-Tetrachloroethane, Methylacetate, Ethylacetate, Propylacetate, Butyl acetate, Dimethylformamide, Diethylformamide, Dimethyl acetamide, Diethylacetamide, Diethylether, Diisopropylether, methyl tert-Butyl ether, THF, Dioxane, Acetonitrile, Sulfolane, DMSO, HMPT, NMP or mixtures of these solvents. Preferred solvents are Dichloromethane, Chloroform, Ethyl acetate, Propyl acetate, Butyl acetate, Dimethylformamide, Diethylformamide, Dimethylacetamide, Diethyl acetamide, Diisopropylether, methyl tert-Butyl ether, THF, Dioxane, Acetonitrile or mixtures of these. Especially preferred solvents are Dichloromethane, Chloroform, Ethyl acetate, Butyl acetate, Dimethylformamide, Dimethylacetamide, methyl tert-Butyl ether, THF, Dioxane, Acetonitrile or mixtures of these.

Definition: Regiospecific

The amphetamine and amphetamine derivatives made by the process herein are sterospecific and regioselective. The process chemistry does not operate at the chiral center.

The term(s) regioselective or regioselectivity, means without limitation, by way of explanation, the preference of one direction of chemical bond making or breaking over all other possible directions. It can often apply to which of many possible positions a reagent will affect, such as which proton a strong base will abstract from an organic molecule, or where on a substituted benzene ring a further substituent will add. Because of the preference for the formation of one product over another, the reaction is selective. This reaction is regioselective because it selectively generates one constitutional isomer rather than the other.

The term regiospecific is used if one product is formed exclusively. Whereas, a reaction that selectively generates one possible product over another is called regioselective, that is, a choice of final product exists, regiospecific reactions are those reactions where the same choice isn't there. A regiospecific reaction exclusively gives only one, specific product.

The term(s) stereoselective or stereoselectivity, means without limitation, by way of explanation, the property of a chemical reaction in which a single reactant forms an unequal mixture of stereoisomers during the non-stereospecific creation of a new stereocenter or during the non-stereospecific transformation of a pre-existing one. The selectivity arises from differences in steric effects and electronic effects in the mechanistic pathways leading to the different products.

The term stereospecific means the property of a reaction mechanism that leads to different stereoisomeric reaction products from different stereoisomeric reactants, or which operates on only one (or a subset) of the stereoisomers.

Amphetamine Stereochemistry

Many organic compounds exist in optically active forms, i.e., they have the ability to rotate the plane of plane-polarized light. In describing an optically active compound, the prefixes R and S are used to denote the absolute configuration of the molecule about its chiral center(s). The prefixes (+) and (−) or d and l are employed to designate the sign of rotation of plane-polarized light by the compound, with (−) and l meaning that the compound is levorotatory. A compound prefixed with (+) and d is dextrorotatory. For a given chemical structure, these compounds, called stereoisomers, are identical except that they are mirror images of one another. A specific stereoisomer may also be referred to as an enantiomer, and a mixture of such isomers is often called an enantiomeric or racemic mixture. Stereochemical purity is of importance in the field of pharmaceuticals, where 12 of the 20 most prescribed drugs are optically active. One example is the l-form of propranolol, which is about 100 times more potent than the d-form. Optical purity is important since certain isomers may be deleterious rather than simply inert. Another example is d-thalidomide that appears to be a safe and effective sedative for controlling morning sickness during pregnancy, whereas l-thalidomide is thought to be a potent teratogen. Amphetamine and derivatives have been marketed as racemic mixtures comprising optical isomers, especially since in some derivatives there are two chiral centers. Previous studies aimed at investigating the pharmacology of these isomers have found significant differences in potency or efficacy on the one hand, and toxicity on the other hand.

A problem with amphetamine synthesis is that amphetamines have a stereo-defined amine center, which can be subject to racemization. Accordingly, only stereospecific methods are useful. However, stereospecific methods do not historically provide the economic requirements of high yields, high selectivity and low process costs. Typically such reactions involve a coupling agent, such as Grignard or organolithium reagents. Conventional teaching requires that the use of such organometallics requires that the reaction temperature be maintained at a cold temperature, such as an ice bath at less than 10° Celsius.

Another problem with amphetamine synthesis is that the intermediates are toxic as well as flammable. This requires special handling such as double-walled drums and safety accommodations to protect manufacturing personnel. For example, the prior art in U.S. Pat. No. 6,399,828 teaches the production of amphetamine using various methods. In one approach norephedrine is refluxed with hydrogen iodide and red phosphorous. In another approach norephedrine is chlorinated using thionyl chloride and then catalytically hydrogenated. In U.S. Pat. No. 7,705,184, amphetamine synthesis is disclosed using hydrogenation of a chlorinated phenylpropanolamine. Aziridine chemistry, and specifically aziridine phosphoramidates are not taught in the amphetamine synthesis prior art.

Another problem stems from the use of protecting groups and leaving groups. There is significant variation among the various protecting groups, such as where a carbonyl is used as a protecting group, the reaction must be kept at below −10° Celsius or the carbonyl will react with the Grignard reagent. In another example, where a sulfonyl is used as a protecting group, it is impossible to remove the protecting group without destroying the molecule.

Another problem is that there is a need for dosage forms for amphetamine-related compounds that have a statistically significant absence of such impurities. Complicating the amphetamine marketplace, established formulations which require racemic amphetamine to obtain an extended release of elevated blood levels of the drug. This racemic material can be obtained by mixing equal parts of the dextrorotary and levorotary stereos isomers or running a synthetic sequence which only produces racemic amphetamine.

The literature, Zwierzak, incorrectly states that the product from the cuprate addition to the aziridine phosphoramidate is always regiospecific, but this is not the case, as evidenced and acknowledged by the U.S. Patent & Trademark Office in the grant of U.S. Pat. Nos. 9,278,904, and 9,321,794. The prior art appears to confuse the term regiospecificity, a detail of chemistry understood by Examiner Chen in the granting of the above patents. In attempting to copy the literature process, it has also been discovered that the process 3-5% of 6 (a, b, c or d) in the crude product, that it could not be removed later in the synthetic sequence. The presence of two products means that the process is not regiospecific, and by stating that it was regiospecific when it is not, the literature does not recognize the problem of the existence of the impurity. It was also found that if you used a single solvent (5 crystallizes from heptane or petroleum ether), then you did not remove the corresponding 6. It is required to leave a residue of the reaction solvent (THF) in the mixture to separate the 5 from 6. Interestingly, it has been discovered that a ratio of specific solvents yielded the most preferred embodiment. This ratio comprises about 7 part heptane and 1 part THF for 5, but the common item was that it was required to leave a residue of TI-IF in the mixture.

Patients, including but not limited to humans, can be treated by administering to the patient an effective amount of the active compound(s) or a pharmaceutically acceptable prodrug or salt thereof in the presence of a pharmaceutically acceptable carrier or diluent. The active materials can be administered by any appropriate route, for example, orally, parenterally, intravenously, intradermally, subcutaneously, or topically, in liquid or solid form.

The concentration of active compound(s) in the drug composition will depend on absorption, inactivation and excretion rates of the drug as well as other factors known to those of skill in the art. It is to be noted that dosage values will also vary with the severity of the condition to be alleviated. It is to be further understood that for any particular subject, specific dosage regimens should be adjusted over time according to the individual need and the professional judgment of the person administering or supervising the administration of the compositions, and that the concentration ranges set forth herein are exemplary only and are not intended to limit the scope or practice of the claimed composition. The active ingredient can be administered at once, or can be divided into a number of smaller doses to be administered at varying intervals of time.

In certain embodiments, the mode of administration of the active compound(s) is oral. Oral compositions will generally include an inert diluent or an edible carrier. They can be enclosed in gelatin capsules or compressed into tablets. For the purpose of oral therapeutic administration, the active compound(s) can be incorporated with excipients and used in the form of tablets, troches or capsules. Pharmaceutically compatible binding agents, and/or adjuvant materials can be included as part of the composition.

The tablets, pills, capsules, troches and the like can contain any of the following ingredients, or compounds of a similar nature: a binder such as microcrystalline cellulose, gum tragacanth or gelatin; an excipient such as starch or lactose, a disintegrating agent such as alginic acid, Primogel or corn starch; a lubricant such as magnesium stearate or Sterotes; a glidant such as colloidal silicon dioxide; a sweetening agent such as sucrose or saccharin; or a flavoring agent such as peppermint, methyl salicylate, or orange flavoring. When the dosage unit form is a capsule, it can contain, in addition to material of the above type, a liquid carrier such as a fatty oil. In addition, unit dosage forms can contain various other materials that modify the physical form of the dosage unit, for example, coatings of sugar, shellac, or other enteric agents.

The compound can be administered as a component of an elixir, suspension, syrup, wafer, chewing gum or the like. A syrup can contain, in addition to the active compound(s), sucrose or sweetener as a sweetening agent and certain preservatives, dyes and colorings and flavors.

The compound or a pharmaceutically acceptable prodrug or salts thereof can also be mixed with other active materials that do not impair the desired action, or with materials that supplement the desired action, such as antibiotics, antifungals, anti-inflammatories or other antivirals, including but not limited to nucleoside compounds. Solutions or suspensions used for parenteral, intradermal, subcutaneous, or topical application can include the following components: a sterile diluent such as water for injection, saline solution, fixed oils, polyethylene glycols, glycerine, propylene glycol or other synthetic solvents; antibacterial agents such as benzyl alcohol or methyl parabens; antioxidants such as ascorbic acid or sodium bisulfite; chelating agents, such as ethylenediaminetetraacetic acid; buffers, such as acetates, citrates or phosphates, and agents for the adjustment of tonicity, such as sodium chloride or dextrose. The parental preparation can be enclosed in ampoules, disposable syringes or multiple dose vials made of glass or plastic.

If administered intravenously, carriers include physiological saline and phosphate buffered saline (PBS).

In certain embodiments, the active compound(s) are prepared with carriers that will protect the compound against rapid elimination from the body, such as a controlled release formulation, including but not limited to implants and microencapsulated delivery systems. Biodegradable, biocompatible polymers can be used, such as ethylene vinyl acetate, polyanhydrides, polyglycolic acid, collagen, polyorthoesters and polylactic acid. For example, enterically coated compounds can be used to protect cleavage by stomach acid. Methods for preparation of such formulations will be apparent to those skilled in the art. Suitable materials can also be obtained commercially.

Liposomal suspensions (including but not limited to liposomes targeted to infected cells with monoclonal antibodies to viral antigens) are also preferred as pharmaceutically acceptable carriers. These can be prepared according to methods known to those skilled in the art, for example, as described in U.S. Pat. No. 4,522,811 (incorporated by reference). For example, liposome formulations can be prepared by dissolving appropriate lipid(s) (such as stearoyl phosphatidyl ethanolamine, stearoyl phosphatidyl choline, arachadoyl phosphatidyl choline, and cholesterol) in an inorganic solvent that is then evaporated, leaving behind a thin film of dried lipid on the surface of the container. An aqueous solution of the active compound(s) is then introduced into the container. The container is then swirled by hand to free lipid material from the sides of the container and to disperse lipid aggregates, thereby forming the liposomal suspension.

The present invention also provides a composition comprising the compounds and compositions described herein. The composition may be a suitable pharmaceutical composition comprising suitable carriers or excipients.

The compositions and methods of the present invention may be utilized to treat a subject in need thereof. In certain embodiments, the subject is a mammal such as a human, or a non-human mammal. When administered to an animal, such as a human, the composition is preferably administered as a pharmaceutical composition comprising, for example, a composition of the invention and a pharmaceutically acceptable carrier. Pharmaceutically acceptable carriers are well known in the art and include, for example, aqueous solutions such as water or physiologically buffered saline or other solvents or vehicles such as glycols, glycerol, oils such as olive oil or injectable organic esters. In preferred embodiments, when such pharmaceutical compositions are for human administration, e.g., for parenteral administration, the aqueous solution is pyrogen-free, or substantially pyrogen-free. The excipients can be chosen, for example, to effect delayed release of an agent or to selectively target one or more cells, tissues or organs. The pharmaceutical composition can be in dosage unit form such as tablet, capsule (including sprinkle capsule and gelatin capsule), granule, powder, syrup, suppository, injection or the like. The composition can also be present in a transdermal delivery system, e.g., a skin patch. The composition can also be present in a solution suitable for topical administration, such as an eye drop.

A pharmaceutically acceptable carrier can contain physiologically acceptable agents that act, for example, to stabilize or to increase the absorption of a composition of the invention. Such physiologically acceptable agents include, for example, carbohydrates, such as glucose, sucrose or dextrans, antioxidants, such as ascorbic acid or glutathione, chelating agents, low molecular weight proteins or other stabilizers or excipients. The choice of a pharmaceutically acceptable carrier, including a physiologically acceptable agent, depends, for example, on the route of administration of the composition. The pharmaceutical composition (preparation) also can be a liposome or other polymer matrix, which can have incorporated therein, for example, a composition of the invention. Liposomes, for example, which comprise phospholipids or other lipids, are nontoxic, physiologically acceptable and metabolizable carriers that are relatively simple to make and administer.

The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The phrase "pharmaceutically acceptable carrier" as used herein means a pharmaceutically acceptable material, composition or vehicle, such as a liquid or solid filler, diluent, excipient, solvent or encapsulating material. Each carrier must be "acceptable" in the sense of being compatible with the other ingredients of the formulation and not injurious to the patient. Some examples of materials which can serve as pharmaceutically acceptable carriers include: (1) sugars, such as lactose, glucose and sucrose: (2) starches, such as corn starch and potato starch; (3) cellulose, and its derivatives, such as sodium carboxymethyl cellulose, ethyl cellulose and cellulose acetate; (4) powdered tragacanth; (5) malt; (6) gelatin; (7) talc; (8) excipients, such as cocoa butter and suppository waxes; (9) oils, such as peanut oil, cottonseed oil, safflower oil, sesame oil, olive oil, corn oil and soybean oil; (10) glycols, such as propylene glycol; (11) polyols, such as glycerin, sorbitol, mannitol and polyethylene glycol; (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) phosphate buffer solutions; and (21) other non-toxic compatible substances employed in pharmaceutical formulations.

A pharmaceutical composition (preparation) can be administered to a subject by any of a number of routes of administration including, for example, orally (for example, drenches as in aqueous or non-aqueous solutions or suspensions, tablets, capsules (including sprinkle capsules and gelatin capsules), boluses, powders, granules, pastes for application to the tongue); absorption through the oral mucosa (e.g., sublingually); anally, rectally or vaginally (for example, as a pessary, cream or foam); parenterally (including intramuscularly, intravenously, subcutaneously or intrathecally as, for example, a sterile solution or suspension); nasally; intraperitoneally; subcutaneously; transdermally (for example as a patch applied to the skin); and topically (for example, as a cream, ointment or spray applied to the skin, or as an eye drop). The compositions may also be formulated for inhalation. In certain embodiments, a composition may be simply dissolved or suspended in sterile water. Details of appropriate routes of administration and compositions suitable for same can be found in, for example, U.S. Pat. Nos. 6,110,973, 5,763,493, 5,731,000, 5,541,231, 5,427,798, 5,358,970 and 4,172,896, as well as in patents cited therein.

In certain embodiments, a single capsule may be used at each administration because a single capsule reproducibly provides simultaneous release of the antibiotic and AGN 201904. In certain embodiments, the capsule is formulated such that the antibiotic (e.g., amoxicillin) is absorbed rapidly along with the absorption of AGN 201904 and with greater gastric acid inhibition. In certain embodiments, near simultaneous release is achieved by administering all components of the invention as a single pill or capsule.

In certain embodiments, compounds of the invention may be used alone or conjointly administered with another type of therapeutic agent. As used herein, the phrase "conjoint administration" refers to any form of administration of two or more different therapeutic compounds such that the second compound is administered while the previously administered therapeutic compound is still effective in the body (e.g., the two compounds are simultaneously effective in the patient, which may include synergistic effects of the two compounds). For example, the different therapeutic compounds can be administered either in the same formulation or in a separate formulation, either concomitantly or sequentially. In certain embodiments, the different therapeutic compounds can be administered within one hour, 12 hours, 24 hours, 36 hours, 48 hours, 72 hours, or a week of one another. Thus, an individual who receives such treatment can benefit from a combined effect of different therapeutic compounds.

In certain embodiments, conjoint administration of compounds of the invention with one or more additional therapeutic agent(s) (e.g., one or more additional antibiotic agent(s)) provides improved efficacy relative to each individual administration of the compound of the invention or the one or more additional therapeutic agent(s). In certain such embodiments, the conjoint administration provides an additive effect, wherein an additive effect refers to the sum of each of the effects of individual administration of the compound of the invention and the one or more additional therapeutic agent(s).

The formulations may conveniently be presented in unit dosage form and may be prepared by any methods well known in the art of pharmacy. The amount of active ingredient which can be combined with a carrier material to produce a single dosage form will vary depending upon the host being treated, the particular mode of administration. The amount of active ingredient that can be combined with a carrier material to produce a single dosage form will generally be that amount of the antibiotic or compound which produces a therapeutic effect. Generally, out of one hundred percent, this amount will range from about 1 percent to about ninety-nine percent of active ingredient, preferably from about 5 percent to about 70 percent, most preferably from about 10 percent to about 30 percent.

In some embodiments of the present invention, the composition that is suitable for use in the invention may be administered orally, topically or parenterally.

Dosage forms for the topical or transdermal administration include powders, sprays, ointments, pastes, creams, lotions, gels, solutions, patches and inhalants. The composition may be mixed under sterile conditions with a pharmaceutically acceptable carrier, and with any preservatives, buffers, or propellants that may be required.

The ointments, pastes, creams and gels may contain, in addition to an antibiotic, excipients, such as animal and vegetable fats, oils, waxes, paraffins, starch, tragacanth, cellulose derivatives, polyethylene glycols, silicones, bentonites, silicic acid, talc and zinc oxide, or mixtures thereof.

Powders and sprays can contain, in addition to the antibiotic or compound, excipients such as lactose, talc, silicic acid, aluminum hydroxide, calcium silicates and polyimide powder, or mixtures of these substances. Sprays can additionally contain customary propellants, such as chlorofluorohydrocarbons and volatile unsubstituted hydrocarbons, such as butane and propane.

The composition of the invention may be formulated with an excipient and component that is common for such oral compositions or food supplements, e.g., especially fatty and/or aqueous components, humectants, thickeners, preserving agents, texturizers, flavor enhancers and/or coating agents, antioxidants and preserving agents. Formulating agents and excipients for oral compositions, and especially for food supplements, are known in this field and will not be the subject of a detailed description herein.

In the case of a composition in accordance with the invention for oral administration, the use of an ingestible support is preferred. The ingestible support may be of diverse nature according to the type of composition under consideration. Tablets, gel capsules or lozenges, suspensions, oral supplements in dry form and oral supplements in liquid form are especially suitable for use as food supports.

Formulation of the oral compositions according to the invention may be performed via any usual process known to those skilled in the art for producing drinkable solutions, sugar-coated tablets, gel capsules, gels, emulsions, tablets to be swallowed or chewed, wafer capsules, especially soft or hard wafer capsules, granules to be dissolved, syrups, solid or liquid foods, and hydrogels allowing controlled release. Formulation of the oral compositions according to the invention may be incorporated into any form of food supplement or enriched food, for example food bars, or compacted or loose powders. The powders may be diluted with water, with soda, with dairy products or soybean derivatives, or may be incorporated into food bars.

In some embodiments, the composition according to the invention administered orally may be formulated in the form of sugar-coated tablets, gel capsules, gels, emulsions, tablets, wafer capsules, hydrogels, food bars, compacted or loose powders, liquid suspensions or solutions, confectioneries, fermented milks, fermented cheeses, chewing gum, toothpaste or spray solutions.

An effective amount of the composition may be administered in a single dose per day or in fractional doses over the day, for example two to three times a day. By way of example, the administration of a composition according to the invention may be performed at a rate, for example, of 3 times a day or more, generally over a prolonged period of at least a week, 2 weeks, 3 weeks, 4 weeks, or even 4 to 15 weeks, optionally comprising one or more periods of stoppage or being repeated after a period of stoppage.

As one of skill in the art will appreciate, compositions of the present invention, not having adverse effects upon administration to a subject, may be administered daily to the subject, Preferred embodiments of this invention are described herein. Of course, variations, changes, modifications and substitution of equivalents of those preferred embodiments will become apparent to those of ordinary skill in the art upon reading the foregoing description. The inventors expect skilled artisans to employ such variations, changes, modifications and substitution of equivalents as appropriate, and the inventors intend for the invention to be practiced otherwise than specifically described herein. Those of skill in the art will readily recognize a variety of non-critical parameters that could be changed, altered or modified to yield essentially similar results. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While each of the elements of the present invention is described herein as containing multiple embodiments, it should be understood that, unless indicated otherwise, each of the embodiments of a given element of the present invention is capable of being used with each of the embodiments of the other elements of the present invention and each such use is intended to form a distinct embodiment of the present invention.

Definitions

For purposes of the present invention, the following definitions will be used (unless expressly stated otherwise).

As used herein, the term "administering" means the actual physical introduction of a composition into or onto (as appropriate) a subject. Any and all methods of introducing the composition into subject are contemplated according to the invention; the method is not dependent on any particular means of introduction and is not to be so construed. Means of introduction are well-known to those skilled in the art, and also are exemplified herein.

As used herein, the terms "effective amount", "effective dose", "sufficient amount", "amount effective to", "therapeutically effective amount" or grammatical equivalents thereof mean a dosage sufficient to produce a desired result, to ameliorate, or in some manner, reduce a symptom or stop or reverse progression of a condition and provide either a subjective relief of a symptom(s) or an objectively identifiable improvement as noted by a clinician or other qualified observer. Amelioration of a symptom of a particular condition by administration of a pharmaceutical composition described herein refers to any lessening, whether permanent or temporary, lasting, or transitory, that can be associated with the administration of the pharmaceutical composition.

As used herein, the term "prodrug" is intended to encompass compounds which, under physiologic conditions, are converted into the therapeutically active agents of the present invention. A common method for making a prodrug is to include one or more selected moieties which are hydrolyzed under physiologic conditions to reveal the desired molecule. In other embodiments, the prodrug is converted by an enzymatic activity of the host animal. For example, esters or carbonates (e.g., esters or carbonates of alcohols or carboxylic acids) are preferred prodrugs of the present invention. In certain embodiments, some or all of the compounds in a formulation represented above can be replaced with the corresponding suitable prodrug, e.g., wherein a hydroxyl in the parent compound is presented as an ester or a carbonate or carboxylic acid present in the parent compound is presented as an ester.

As used herein, the term "pharmaceutically acceptable" refers to compositions that are physiologically tolerable and do not typically produce an allergic or similar untoward reaction when administered to a subject, preferably a human subject. Preferably, as used herein, the term "pharmaceutically acceptable" means approved by a regulatory agency of a federal or state government or listed in the U.S. Pharmacopeia or other generally recognized pharmacopeia for use in animals, and more particularly in humans.

As used herein, a therapeutic that "prevents" a disorder or condition refers to a compound that, in a statistical sample, reduces the occurrence of the disorder or condition in the treated sample relative to an untreated control sample, or delays the onset or reduces the severity of one or more symptoms of the disorder or condition relative to the untreated control sample.

As used herein, a "subject" means a human or animal (in the case of an animal, more typically a mammal). In one aspect, the subject is a human.

As used herein, the term "treating" is art-recognized and includes administration to the host of one or more of the subject compositions, e.g., to diminish, ameliorate, or stabilize the existing unwanted condition or side effects thereof.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

The invention claimed is:

1. A non-distillative process for manufacturing a substituted sulfate amphetamine, comprising: adding aqueous $H_2SO_4$ to a (S or R,S) (dialkyl or diaryl) (1-phenylpropan-2-yl) phosphoramidate compound, warming to 80° C., cooling to 20° C., washing in isopropanol or toluene, combining organic layers, and collecting a solid by filtration, wherein the solid is (S,R, S,S, R,R or R,S) (dialkyl or diaryl)(1-phenylpropan-2-amine) sulfate.

2. The process of claim 1, wherein the substituted amphetamine sulfate is dexamphetamine sulfate and the (S or R,S) (dialkyl or diaryl) (1-phenylpropan-2-yl) phosphoramidate compound is (S or R,S) (diethyl) (1-phenylpropan-2-yl) phosphoramidate.

3. The process of claim 1, further comprising the steps of concentrating the substituted amphetamine sulfate in isopropanol, and then salting out the substituted amphetamine compound directly to obtain a substituted amphetamine salt, the substituted amphetamine salt selected from a substituted amphetamine saccharate, a substituted amphetamine sulfate, a substituted amphetamine aspartate, an alkyl-amphetamine saccharate, an alkyl-amphetamine sulfate, an alkyl-amphetamine aspartate, an aryl-amphetamine saccharate, an aryl-amphetamine sulfate, an aryl-amphetamine aspartate, and mixtures thereof.

4. The process of claim 1, wherein the substituted amphetamine sulfate is >99% pure.

5. The process of claim 3, wherein the substituted amphetamine salt is selected from dextroamphetamine saccharate, dextroamphetamine sulfate, or dextroamphetamine aspartate.

6. The process of claim 1, wherein the substituted amphetamine sulfate is optically active or a racemic mixture thereof.

7. The process of claim 1, wherein the substituted amphetamine sulfate is selected from the group consisting of a dextroamphetamine salt, a levoamphetamine salt, or a mixture thereof.

8. The process of claim 1, where the substituted amphetamine sulfate is formulated in a pharmaceutically acceptable composition.

9. The process of claim 1, further comprising the step of washing with methyl-tert-butyl-ether (MTBE) after washing with isopropanol or toluene but before combining organic layers.

10. The process of claim 1, wherein the phosphoramidate is diethyl-(1-phenylpropan-2-y) phosphoramidate and is optically active.

11. The process of claim 1, wherein the phosphoramidate is diethyl(S)-(1-phenylpropan-2-y) phosphoramidate, diethyl (R)-(1-phenylpropan-2-y) phosphoramidate or mixtures thereof.

12. The process of claim 1, wherein the substituted amphetamine is optically active, dextrorotatory, levorotatory, or racemic.

13. The process of claim 1, wherein the purity of the substituted amphetamine sulfate is not less than 98% on a weight basis.

14. The process of claim 1, wherein the substituted amphetamine sulfate comprises a regiospecific impurity β-methylphenethylamine present at a level of less than 0.1% on a weight basis.

15. The process of claim 1, further comprising wherein the substituted amphetamine sulfate is converted to lisdexamfetamine.

16. A process, comprising:
(i) reacting (S or R,S) (dialkyl or diaryl)(1-phenylpropan-2-yl)phosphoramidate, with 3N HCl at 80° C. for 1.5 h, cooling to room temperature, adding toluene and agitating, and removing an organic layer;
(i reacting the organic layer with 50% NaOH to adjust pH to 13, agitating with methyl-tert-butyl-ether (MTBE), separating an aqueous layer from an organic layer, washing the organic layer with MTBE;
(iii) diluting the organic layer with isopropanol, warming to 45-50° C., and concentrating under vacuum to obtain (S or R,S) (dialkyl or diaryl)(1-phenylpropan-2-yl) amine dissolved in isopropanol;
(iv) adding $H_2SO_4$ aq and isopropanol to the (S or R,S) (dialkyl or diaryl) (1-phenylpropan-2-yl)-amine dissolved in isopropanol while maintaining 45-50° C.;
(v) adding isopropanol, and warming to 80° C. for 1 h, cooling to 50° C. over 6 h, 20° C. over 5 h, and maintaining at 20° C. for 4 h;
(vi) adding isopropanol and cooling to 5° C., agitating for 6 h;
(vii) collecting a solid by filtration, washing with cold isopropanol/water;
wherein the solid is a (S or R,S) (dialkyl or diaryl) (1-phenylpropan-2-yl)-amine [$H_2SO_4$] having a purity of >99.9%.

17. The process of claim 16, wherein the (S or R,S) (dialkyl or diaryl) (1-phenylpropan-2-yl)-amine is converted to a saccharic acid salt or a aspartic acid salt, the steps comprising:
(xi) making a slurry in water at RT of the (S or R,S) (dialkyl or diaryl) (1-phenylpropan-2-yl)-amine, adding 50% aq NaOH, stir 0.5 h, agitating 0.5 h w/MTBE, and obtaining an organic layer, diluting the organic layer with isopropanol, warming to 50° C., concentrating under vacuum, and cooling to RT;
(xii) making slurry from a saccharate or aspartate, cooling the slurry to 5° C. and treating with concentrated $H_2SO_4$ aq., agitating for 0.25 h at 5° C., warming to RT, stirring for 1 h, diluting with isopropanol and agitating for 1 h, and filtering to obtain a saccharic acid filtrate or aspartic acid filtrate;

(xiii) adding saccharic acid filtrate or aspartic acid filtrate to the (S or R,S) (dialkyl or diaryl) (1-phenylpropan-2-yl)-amine to obtain a slurry, agitating for 1.5 h at RT, gradually warming and holding at 55° C., slowly adding water to yield clear solution, agitating the clear solution for 2 h, reducing the heat to 45° C. over 3 h, cooling to 5° C. over 5 h, holding for 7 h, and obtaining a white solid by filtration;

wherein the white solid is >99.9% chiral (dex) isomer of (S or R,S) (dialkyl or diaryl) (1-phenylpropan-2-yl)-amine or (S or R,S) (dialkyl or diaryl) (1-phenylpropan-2-yl)-amine.

18. A process, comprising:
(i) reacting (S or R,S) (dialkyl or diaryl)(1-phenylpropan-2-yl)phosphoramidate, with $H_2SO_4$ aq and warming to 80° C. for 1 h, cooling to 20° C.;
(ii) adding toluene, concentrating under vacuum, wash/repeat until water wt. is 0.11 weight %;
(iii) adding toluene, warming to 80° C., agitating 1 h, cooling to 50° C. over 2 h, cooling to RT, and holding at RT 4-24 h;
(iv) cooling to 5° C., and holding for 12 h;
(v) collecting a solid by filtration;
wherein the solid is a (S or R,S) (dialkyl or diaryl) (1-phenylpropan-2-yl)-amine [$H_2SO_4$] having a purity of >99.92% AUC.

19. The process of claim 18, wherein the (S or R,S) (dialkyl or diaryl) (1-phenylpropan-2-yl)-amine is converted to a saccharic acid salt or a aspartic acid salt, the steps comprising:
(vi) making a slurry in water at RT of the (S or R,S) (dialkyl or diaryl) (1-phenylpropan-2-yl)-amine, adding 50% aq NaOH, stir 0.5 h, agitating 0.5 h w/MTBE, and obtaining an organic layer, diluting the organic layer with isopropanol, warming to 50° C., concentrating under vacuum, and cooling to RT;
(vii) making slurry from a saccharate or aspartate, cooling the slurry to 5° C. and treating with concentrated $H_2SO_4$ aq., agitating for 0.25 h at 5° C., warming to RT, stirring for 1 h, diluting with isopropanol and agitating for 1 h, and filtering to obtain a saccharic acid filtrate or aspartic acid filtrate;
(viii) adding saccharic acid filtrate or aspartic acid filtrate to the (S or R,S) (dialkyl or diaryl) (1-phenylpropan-2-yl)-amine to obtain a slurry, agitating for 1.5 h at RT, gradually warming and holding at 55° C., slowly adding water to yield clear solution, agitating the clear solution for 2 h, reducing the heat to 45° C. over 3 h, cooling to 5° C. over 5 h, holding for 7 h, and obtaining a white solid by filtration;
wherein the white solid is >99.9% chiral (dex) isomer of (S or R,S) (dialkyl or diaryl) (1-phenylpropan-2-yl)-amine or (S or R,S) (dialkyl or diaryl) (1-phenylpropan-2-yl)-amine.

\* \* \* \* \*